United States Patent
Wang et al.

(10) Patent No.: US 11,652,910 B2
(45) Date of Patent: May 16, 2023

(54) DATA TRANSMISSION METHOD, DEVICE, AND SYSTEM

(71) Applicant: Huawei Technologies Co., Ltd., Shenzhen (CN)

(72) Inventors: Donghui Wang, Beijing (CN); Hongpei Li, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 17/139,581

(22) Filed: Dec. 31, 2020

(65) Prior Publication Data

US 2021/0126990 A1 Apr. 29, 2021

Related U.S. Application Data

(63) Continuation of application No. PCT/CN2019/129237, filed on Dec. 27, 2019.

(30) Foreign Application Priority Data

Jan. 4, 2019 (CN) .......................... 201910009031.6

(51) Int. Cl.
*H04L 69/22* (2022.01)
*H04W 4/70* (2018.01)
*H04L 9/40* (2022.01)

(52) U.S. Cl.
CPC .......... *H04L 69/22* (2013.01); *H04L 63/0485* (2013.01); *H04L 63/12* (2013.01); *H04W 4/70* (2018.02)

(58) Field of Classification Search
CPC ..... H04L 69/22; H04L 63/0485; H04L 63/12; H04L 63/123; H04L 29/06; H04L 63/0428; H04L 63/126; H04W 4/70
See application file for complete search history.

(56) References Cited

U.S. PATENT DOCUMENTS

2018/0375841 A1 12/2018 Tola
2019/0158453 A1* 5/2019 Stahl ................... H04L 63/0245
(Continued)

FOREIGN PATENT DOCUMENTS

CN 101088245 A 12/2007
CN 101621510 A 1/2010
(Continued)

OTHER PUBLICATIONS

QALALWI "Light Weight Security Protocol in Internet of Things (IOT): IPsec protocol performance analysis," Total 6 pages (Jan. 2016).

*Primary Examiner* — Charles C Jiang
*Assistant Examiner* — Shawn D Miller
(74) *Attorney, Agent, or Firm* — Leydig, Voit & Mayer, Ltd.

(57) ABSTRACT

A data transmission method, device, and system are provided. The method includes: receiving a first data packet sent by an external network device; verifying an authentication header (AH) packet header of the first data packet by using a first security association (SA); and sending the first data packet to an internet of things (IoT) device if the verification succeeds. According to the embodiments of this application, storage overheads and computational overheads of the IoT device in internet of things can be reduced, to implement end-to-end secure communication between the IoT device and the external network device, and improve security of a communications system.

20 Claims, 20 Drawing Sheets

(56) References Cited

U.S. PATENT DOCUMENTS

| | | | | |
|---|---|---|---|---|
| 2019/0289006 A1* | 9/2019 | Fang | ........................ | H04L 67/12 |
| 2019/0364420 A1* | 11/2019 | Rommer | ............. | H04L 61/5007 |
| 2020/0053190 A1* | 2/2020 | Uddin | ..................... | H04L 45/64 |

FOREIGN PATENT DOCUMENTS

| | | | |
|---|---|---|---|
| CN | 101980558 | A | 2/2011 |
| CN | 102347870 | A | 2/2012 |
| CN | 104052668 | A | 9/2014 |
| CN | 106209932 | A | 12/2016 |
| CN | 106375390 | A | 2/2017 |
| CN | 107453869 | A | 12/2017 |
| CN | 107911212 | A | 4/2018 |
| CN | 108140085 | A | 6/2018 |
| CN | 108353076 | A | 7/2018 |
| CN | 109104428 | A | 12/2018 |
| WO | 2015116768 | A2 | 8/2015 |

* cited by examiner

DATA TRANSMISSION METHOD, DEVICE, AND SYSTEM

CROSS-REFERENCE TO RELATED APPLICATIONS

This application is a continuation of International Application No. PCT/CN2019/129237, filed on Dec. 27, 2019, which claims priority to Chinese Patent Application No. 201910009031.6, filed on Jan. 4, 2019. The disclosures of the aforementioned applications are hereby incorporated by reference in their entireties.

TECHNICAL FIELD

Embodiments of this application relates to the field of communications technologies, and in particular, to a data transmission method, device, and system.

BACKGROUND

As internet of things technologies develop and popularize, internet of everything (Internet of Things, IoT) applications have been gradually applied to fields related to human life security and national security, such as the fields of transportation, electric power, home, and industry. Communication security is critical in the internet of things field.

Currently, to implement end-to-end secure communication in internet of things, a higher-layer security protocol, for example, a network layer security protocol (IP security, IPsec), is usually introduced into the prior art to ensure the end-to-end secure transmission. When the IPsec protocol is used to implement the end-to-end secure transmission, a transmit end and a receive end each locally store a pair of keys negotiated by the two ends, and need to verify, based on the pair of keys, a source and a destination of data transmitted between the two ends, to ensure the end-to-end secure communication. However, as a network continuously extends, each transceiver node needs to communicate with a plurality of other transceiver nodes. Therefore, the transceiver node needs to locally store a key between the transceiver node and each of the other nodes to ensure the end-to-end secure communication. Consequently, the transceiver node has high storage overheads. In addition, because a key is used for verification in both a data sending process and a data receiving process, the transceiver node has high computational overheads. In other words, the existing IPsec protocol has a comparatively high requirement on both a storage capability and a compute capability of the transceiver node.

However, in the internet of things, there are some devices sensitive to computing and storage. The devices can hardly meet the comparatively high requirement on both the storage capability and the compute capability in the existing IPsec protocol. Therefore, the end-to-end secure communication is difficult to be ensured, and a high security risk exists.

SUMMARY

This application provides a data transmission method, device, and system, to reduce storage overheads and computational overheads of an IoT device in internet of things, implement end-to-end secure communication between the IoT device and an external network device, and improve security of a communications system.

According to a first aspect, this application provides a data transmission method. The method includes: receiving a first data packet sent by an external network device; verifying an authentication header AH packet header of the first data packet by using a first security association SA; and sending the first data packet to an internet of things IoT device if the verification succeeds. In the implementation scenario, the first SA is used to verify the AH packet header. According to the solution provided in this embodiment, a data transmission device shares a work of verifying the AH packet header with the IoT device. This reduces computational overheads of the IoT device, and implements lightweight end-to-end secure transmission.

In a possible design, the sending the first data packet to an internet of things IoT device includes: removing the AH packet header of the first data packet; and sending, to the IoT device, the first data packet from which the AH packet header is removed. According to the solution provided in this embodiment, the IoT device is prevented from repeatedly verifying the AH packet header, and this further reduces the computational overheads of the IoT device.

In a possible design, the method further includes: sending a second SA to the IoT device, so that the IoT device parses the first data packet by using the second SA. In the implementation scenario, the second SA is used to parse the first data packet. In other words, the data transmission device undertakes an SA storage work, and the IoT device parses the data packet by using the second SA sent by the data transmission device. This reduces storage overheads of the IoT device, and implements the lightweight end-to-end secure transmission.

According to a second aspect, this application provides a data transmission method. The method includes: receiving a first data packet sent by an external network device; and sending the first data packet and a second SA to an internet of things IoT device, so that the IoT device parses the first data packet by using the second SA. In the implementation scenario, the second SA is used to parse the first data packet. According to the solution provided in this embodiment, a data transmission device undertakes an SA storage work, and the IoT device parses the data packet by using the second SA sent by the data transmission device. This reduces storage overheads of the IoT device, and implements lightweight end-to-end secure transmission.

In a possible design, the first data packet is sent after the AH packet header is verified by using a first SA. In the implementation scenario, the first SA is used to verify the AH packet header. According to the solution provided in this embodiment, the data transmission device shares a work of verifying the AH packet header with the IoT device. This reduces computational overheads of the IoT device, and implements the lightweight end-to-end secure transmission.

In a possible design, the first data packet is sent after the AH packet header is successfully verified by using the first SA and the AH packet header is removed. According to the solution provided in this embodiment, the IoT device is prevented from repeatedly verifying the AH packet header, and this further reduces computational overheads of the IoT device.

According to a third aspect, this application provides a data transmission method. The method includes: receiving a second data packet sent by an internet of things IoT device; encapsulating an authentication header AH packet header of the second data packet by using a first SA; and sending an encapsulated second data packet to an external network device. In the implementation scenario, the first SA is used to provide a basis for verifying the AH packet header. According to the solution provided in this embodiment, a data transmission device shares a work of encapsulating the AH packet header with the IoT device. This reduces computational overheads of the IoT device, and implements lightweight end-to-end secure transmission.

In a possible design, the second data packet is sent by the IoT device after being encapsulated by using a second SA. In the implementation scenario, the second SA is used to encrypt and encapsulate the second data packet. In other words, when data is sent, both the first SA and the second SA are used to process the second data packet. This helps further improve security of transmitting the second data packet between the IoT device and the external network device.

In a possible design, the method further includes: receiving a second SA obtaining request sent by the IoT device; and sending the second SA to the IoT device. In other words, the data transmission device undertakes an SA storage work, and the IoT device encapsulates the data packet by using the second SA sent by the data transmission device. This reduces storage overheads of the IoT device, and implements the lightweight end-to-end secure transmission.

According to a fourth aspect, this application provides a data transmission method. The method includes: receiving a second data packet sent by an internet of things IoT device, where the second data packet is sent by the IoT device after being encapsulated by using a second SA; and sending the second data packet to an external network device. In the implementation scenario, the second SA is used to encrypt and encapsulate the second data packet. In other words, a data transmission device undertakes an SA storage work, and the IoT device encapsulates the data packet by using the second SA sent by the data transmission device. This reduces storage overheads of the IoT device, and implements lightweight end-to-end secure transmission.

In a possible design, the sending the second data packet to an external network device includes: encapsulating an authentication header AH packet header of the second data packet by using a first SA; and sending an encapsulated second data packet to the external network device. In the implementation scenario, the first SA is used to provide a basis for verifying the AH packet header. The data transmission device shares a work of encapsulating the AH packet header with the IoT device. This reduces computational overheads of the IoT device, and implements lightweight end-to-end secure transmission.

In a possible design, the method further includes: receiving a second SA obtaining request sent by the IoT device; and sending the second SA to the IoT device.

According to any one of the first aspect to the fourth aspect, or the foregoing possible implementations, an implementation is further provided. The method further includes: receiving the first SA and the second SA that are sent by the IoT device; and storing the first SA and the second SA. According to the solution provided in this embodiment, the data transmission device undertakes a storage work of the IoT device, to reduce storage overheads of the IoT device.

According to any one of the first aspect to the fourth aspect, or the foregoing possible implementations, an implementation is further provided. The first SA and the second SA are determined by the IoT device through negotiation with the external network device. In other words, the SA is determined in an automatic negotiation manner, to reduce manual maintenance costs.

According to any one of the first aspect to the fourth aspect, or the foregoing possible implementations, an implementation is further provided. The storing the first SA and the second SA includes: correspondingly storing the first SA, the second SA, an IoT device identifier, and an external network device identifier. The implementation helps centralized storage of SAs between both a plurality of IoT devices and a plurality of external network devices, and helps reduce system complexity and maintenance costs.

According to any one of the first aspect to the fourth aspect, or the foregoing possible implementations, an implementation is further provided. The first SA and the second SA are stored in a local storage location or a third-party storage location. In other words, computational overheads and storage overheads of the IoT device may be shared by different devices. This reduces a storage requirement for the data transmission device, and helps expansion and application, with high flexibility.

According to any one of the first aspect to the fourth aspect, or the foregoing possible implementations, an implementation is further provided. The second SA is a second SA encrypted by using a local key of the IoT device. Based on the design, when the data transmission device cannot forward the data packet, the data transmission device can obtain a plaintext transmitted in the data packet. This helps improve the end-to-end secure transmission.

According to a fifth aspect, this application provides a data transmission device, including a module, a component, or a circuit configured to implement the data transmission method in any one of the first to the fourth aspects.

According to a sixth aspect, this application provides a data transmission device, including a memory, a processor, and a transceiver. The processor is configured to perform the data transmission method according to the first aspect, the second aspect, the third aspect, or the fourth aspect. The transceiver is configured to interact with another device.

In a possible design, the data transmission device in the fifth aspect or the sixth aspect is a gateway device between an external network and an IoT network, or an agent node in the IoT network. The agent node is configured to exchange data between the gateway device and the IoT device.

According to a seventh aspect, this application provides an IoT device, including a module, a component, or a circuit configured to implement a data transmission method corresponding to the data transmission method according to any one of the first to the fourth aspects.

According to an eighth aspect, this application provides an IoT device, including a memory, a processor, and a transceiver. The processor is configured to perform a data transmission method corresponding to the data transmission method according to the first aspect, the second aspect, the third aspect, or the fourth aspect. The transceiver is configured to interact with another device.

In a possible design, the IoT device in the seventh aspect or the eighth aspect may be a terminal device in a wireless personal area network.

According to a ninth aspect, this application provides a data transmission system, including the data transmission device according to any one of the fifth aspect or the sixth aspect and the IoT device according to any one of the seventh aspect or the eighth aspect.

According to a tenth aspect, this application provides a computer-readable storage medium. The computer-readable storage medium stores a computer program. When the computer program runs on a computer, the computer is enabled to perform the method according to the first aspect, the second aspect, the third aspect, or the fourth aspect.

According to an eleventh aspect, this application provides a computer program. When being executed by a computer, the computer program is used to perform the method according to the first aspect, the second aspect, the third aspect, or the fourth aspect.

According to a twelfth aspect, this application provides a computer-readable storage medium. The computer-readable storage medium stores a computer program. When the computer program runs on a computer, the computer is enabled to perform a data transmission method corresponding to the data transmission method according to the first aspect, the second aspect, the third aspect, or the fourth aspect.

According to a thirteenth aspect, this application provides a computer program. When being executed by a computer, the computer program is used to perform a data transmission method corresponding to the data transmission method according to the first aspect, the second aspect, the third aspect, or the fourth aspect.

In a possible design, all or some of the programs in the twelfth aspect or the thirteenth aspect may be stored in a storage medium that is encapsulated with a processor, or some or all of the programs may be stored in a memory that is not encapsulated with a processor.

According to a fourteenth aspect, this application provides a processor. The processor includes at least one circuit, configured to perform the method according to the first aspect, the second aspect, the third aspect, or the fourth aspect.

DESCRIPTION OF EMBODIMENTS

Some terms used in implementations of this application are merely used to explain specific embodiments of this application, but are not intended to limit this application.

In this application, "at least one" means one or more, and "a plurality of" means two or more. The term "and/or" describes an association relationship between associated objects and may indicate three relationships. For example, A and/or B may indicate the following cases: Only A exists, both A and B exist, and only B exists, where A and B may be singular or plural. The character "/" generally indicates an "or" relationship between the associated objects. "At least one of the following items (pieces)" or a similar expression means any combination of the items, including any combination of singular items (pieces) or plural items (pieces). For example, at least one (piece) of a, b, or c may represent: a, b, c, a-b, a-c, b-c, or a-b-c, where a, b, and c may be singular or plural.

Figure 1:
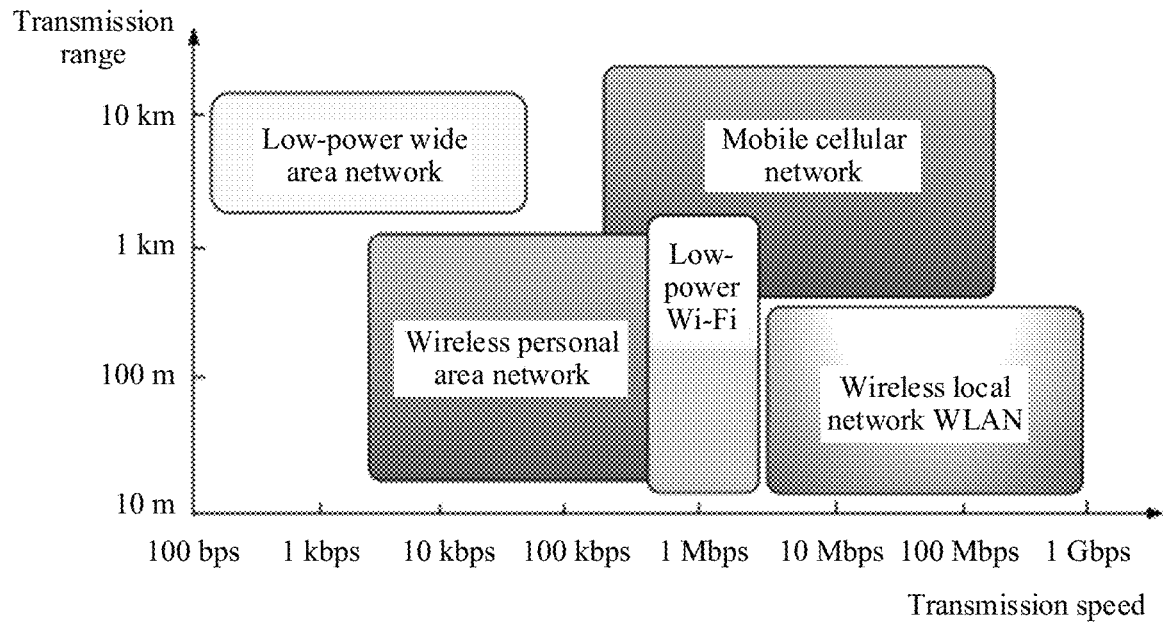
FIG. 1 is a schematic diagram of an IoT network scenario according to an embodiment of this application.

The embodiments of this application may be applied to various types of IoT network scenarios. FIG. 1 is a schematic diagram of an IoT network scenario according to an embodiment of this application. As shown in FIG. 1, an IoT network has many network scenarios, such as, a mobile cellular network, a low-power wide area network, a wireless personal area network, a wireless local area network, and a low-power wireless-fidelity (Wi-Fi) network shown in FIG. 1. As shown in FIG. 1, transmission speeds and transmission ranges of IoT networks are different. Different wireless protocols are used for network transmission in the IoT network scenarios.

Because different transmission protocols are used in the IoT network scenarios, in a data transmission process, different security protocols are used in the network scenarios for data transmission. As an end-to-end security protocol, an IPsec protocol attracts much attention.

The IPsec protocol is a complex protocol suite, including a key agreement (Internet Key Exchange, IKE) protocol, an authentication header (AH) protocol, an encapsulating security payload (ESP) protocol used to ensure data integrity and confidentiality, and the like. In a specific process of implementing end-to-end secure transmission by using the IPsec protocol, a security association (SA) may be generated through negotiation by using the IKE protocol or in a manual configuration manner. Different SAs may be obtained by using the different protocols.

The following two cases may be specifically included. One unique SA may be obtained by using the AH protocol, a peer address of a data packet, and a security parameter index (SPI). The SA is referred to as a first SA for short in the embodiments of this application, and the first SA is used to verify an AH packet header. One unique SA may also be obtained by using the ESP protocol, a peer address of a data packet, and an SPI. The SA is referred to as a second SA for short in the embodiments of this application. The second SA is used to encrypt and encapsulate or parse a packet. Regardless of a protocol, the obtained SA includes information such as a key and a decryption algorithm or an encryption algorithm that are required in the secure transmission process. The SA is usually stored in a security policy database (SPD) and a security association database (SAD). The SPD is used to store an IPsec communication rule. The SAD is used to store a parameter used by the IPsec communication rule.

It should be understood that, although terms such as "first", "second", and "third" may be used in the embodiments of this application to describe the SA, the SA should not be limited to these terms. The terms are merely used to distinguish the SA from one another. For example, without departing from the scope of the embodiments of this application, the first SA may also be referred to as a second SA. Likewise, the second SA may also be referred to as a first SA.

Figure 2:
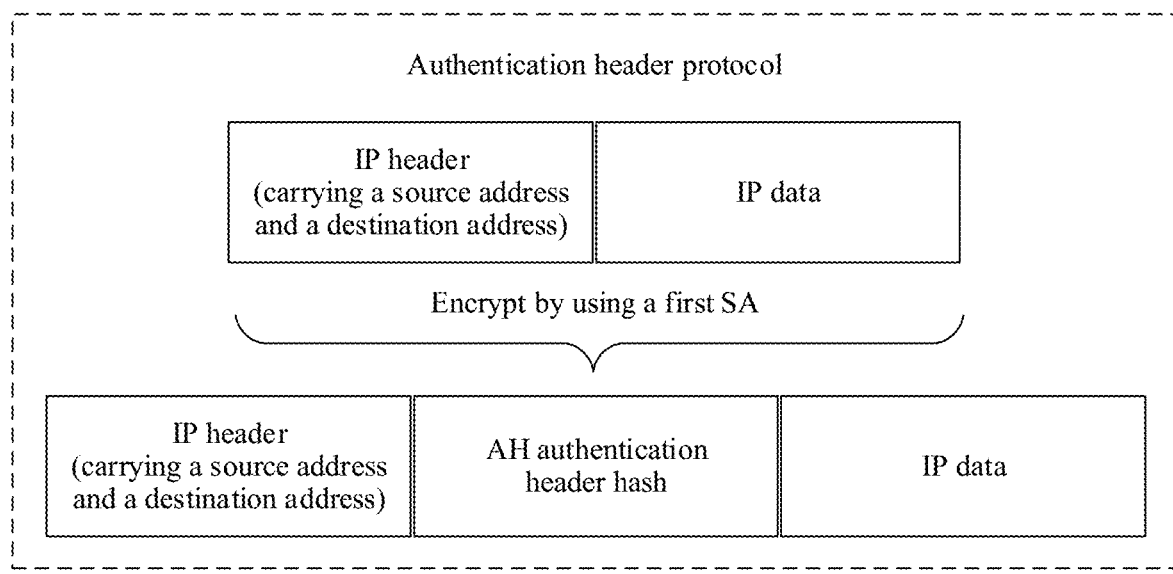
FIG. 2 is a schematic diagram of a process of encrypting a packet by using a first SA according to this application.
Figure 3:
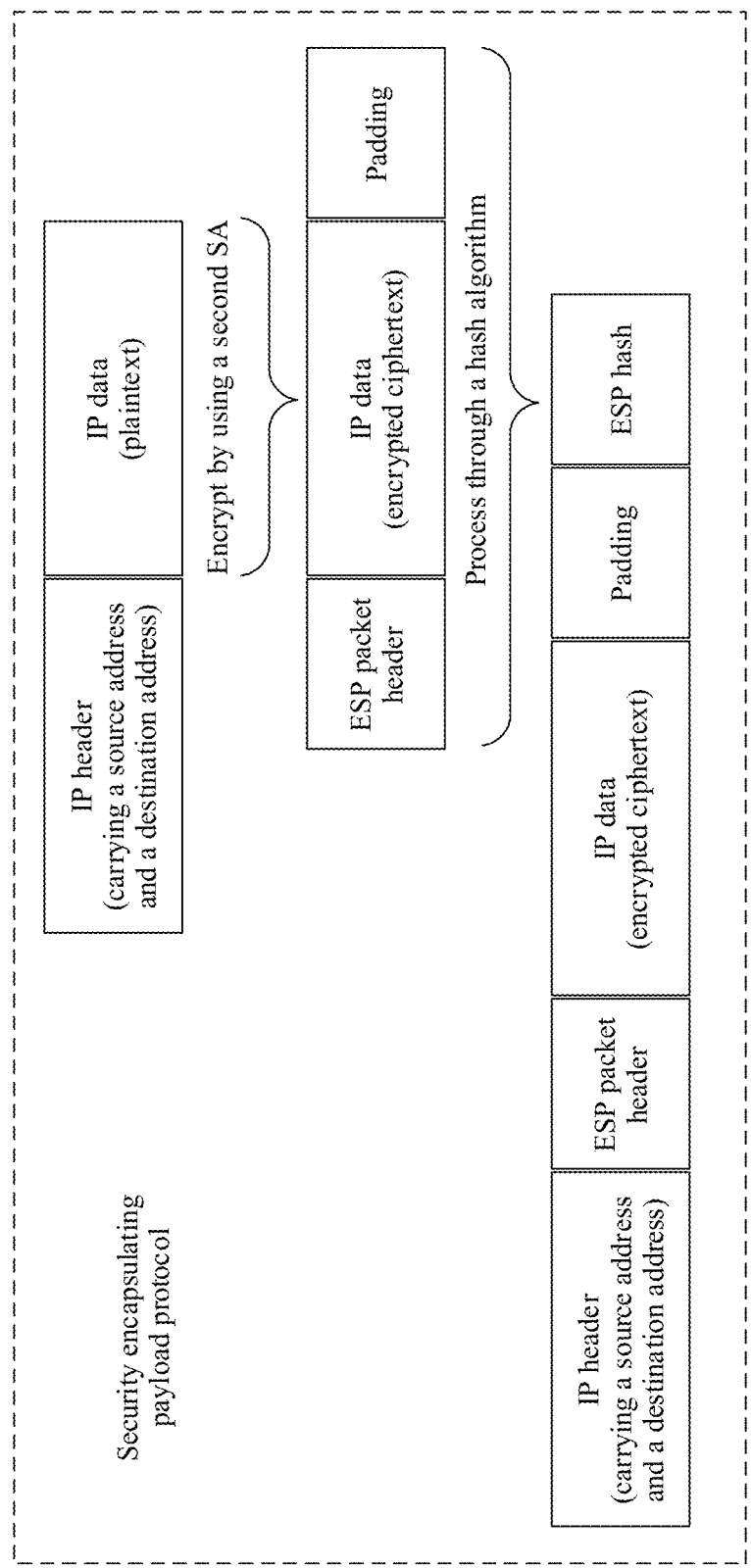
FIG. 3 is a schematic diagram of a process of encrypting a packet by using a second SA according to this application.

When the end-to-end secure transmission is implemented by using the IPsec protocol, the first SA and/or the second SA may be used. In this case, refer to FIG. 2 and FIG. 3. FIG. 2 shows a process of verifying an AH packet header by using a first SA. FIG. 3 shows a process of encrypting a packet by using a second SA.

As shown in FIG. 2, when a transmit end sends an IP packet (including an IP header and IP data), the transmit end may process the IP packet by using a first SA negotiated with a receive end to obtain one encrypted hash value as an AH authentication header hash (an AH packet header), so that the transmit end adds the AH authentication header hash to the packet header of the IP packet, and sends the IP data packet. Correspondingly, after receiving the IP data packet, the receive end may verify the AH authentication header hash (namely, the AH packet header) of the data packet. Therefore, if the receive end can decrypt the AH header by using a first SA negotiated with the transmit end, the receive end may determine that the IP data packet is from the transmit end, to implement secure transmission between the transmit end and the receive end.

As shown in FIG. 3, when a transmit end sends an IP packet (including an IP header and IP data), the transmit end may encrypt a data part in the IP packet by using a second SA negotiated with a receive end to convert the IP data from a plaintext into a ciphertext, and encrypt an ESP header and the obtained ciphertext through a hash algorithm to obtain an ESP hash, so that the transmit end adds the ESP header, the encrypted IP data, and the ESP hash to the IP packet, and sends the IP data packet. Correspondingly, after the receive end receives the IP data packet, if the receive end can decrypt the ciphertext by using a second SA negotiated with the transmit end, the receive end may determine that the receive end is a target receive end to which the transmit end sends the IP packet, to implement secure transmission between the transmit end and the receive end.

It can be learned from the solutions in FIG. 2 and FIG. 3 that, when the end-to-end secure transmission is implemented by using an IPsec protocol, at least a pair of SAs (the first SA and the second SA) negotiated or configured by the transmit end and the receive end are stored between the transmit end and the receive end. In addition, when the data packet is sent or received, the data packet is processed by using the SA. Therefore, there is a comparatively high requirement on both a storage capability and a compute capability between the transmit end and the receive end.

However, in an IoT network, there are some power consumption-sensitive devices, for example, some smart home devices or smart sensors. The power consumption-sensitive devices are comparatively sensitive to a compute capability and a storage capability, and cannot meet the requirement on storage and computing required by the IPsec protocol. In other words, an existing end-to-end secure transmission method cannot meet a data transmission requirement of a power consumption-sensitive device for low power consumption and high security.

A data transmission method provided in this application aims to resolve the foregoing technical problem in the prior art. The following solution idea is proposed: With assistance of a third-party device, storage overheads in an IPsec protocol are transferred from an IoT device, and some computational overheads for processing data by using an SA are also transferred, to reduce storage overheads and computational overheads of the IoT device, to implement end-to-end secure transmission by using the IPsec protocol.

Based on the inventive concept, the following specifically describes a data transmission system constructed in the embodiments of this application with reference to the accompanying drawings.

Figure 4:
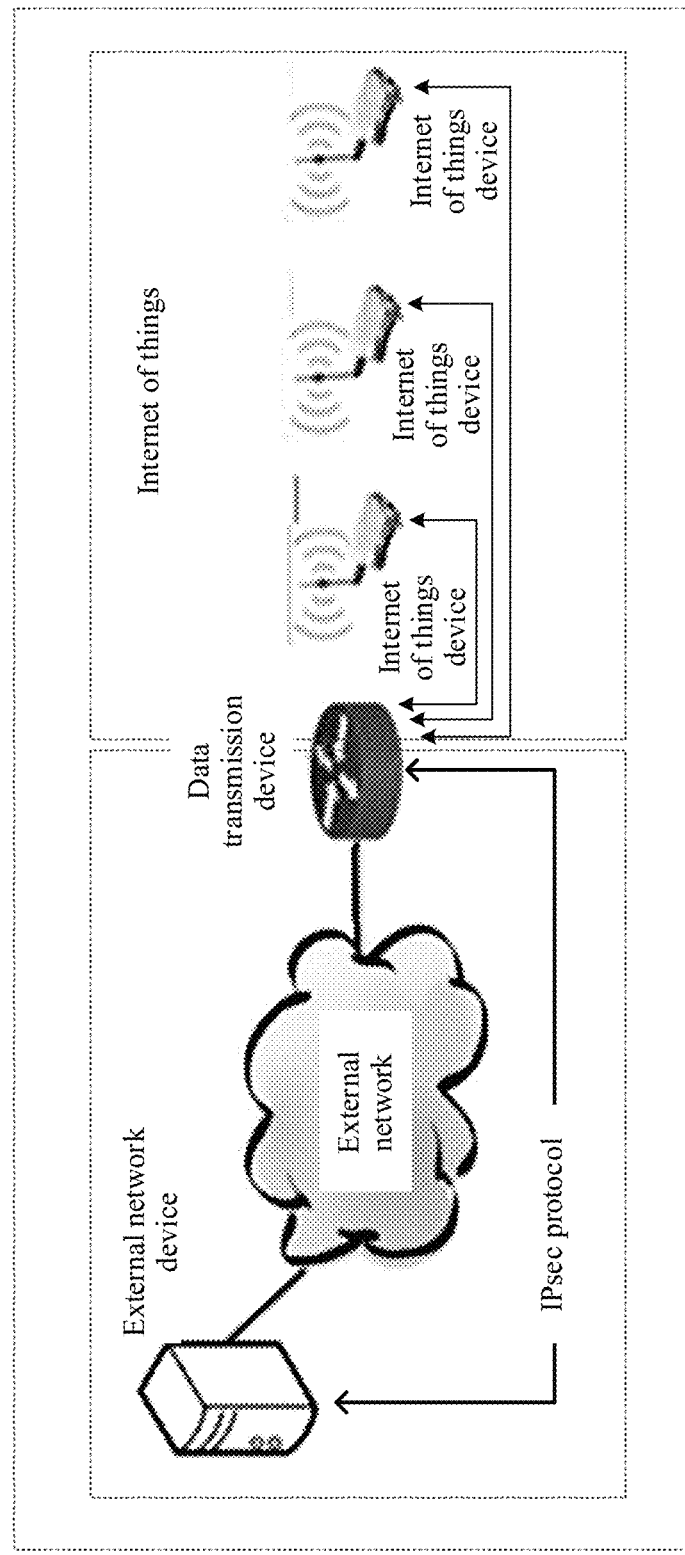
FIG. 4 is a schematic structural diagram of a data transmission system according to this application.

FIG. 4 is a schematic architectural diagram of a data transmission system. FIG. 4 relates to end-to-end communication between an IoT device and an external network device.

In the end-to-end communication scenario, the IoT device may be a communications device in any IoT network shown in FIG. 1, for example, the communications device in the wireless personal area network. Further, the IoT device may be specifically a terminal device in an IoT network. In a specific implementation scenario, the IoT device may be a terminal device having a comparatively weak computational capability and storage capability in the IoT network, and may include but is not limited to a smart sensor, a smart home device, a smart meter, and the like.

It should be noted that the IoT device in this embodiment of this application may include but is not limited to the terminal device having the comparatively weak computational capability and storage capability in the IoT network. A terminal device having a normal or comparatively high computational capability and storage capability in the IoT network is also applicable to this solution.

The external network device is a communications device in another network other than the IoT network, and is an external network relative to the IoT network to which the IoT device belongs. In a possible design, the external network may be another IoT network different from the IoT network to which the IoT device belongs. The IoT network scenario shown in FIG. 1 is used as an example. The IoT device may be one terminal device in the wireless personal area network, and relative to the IoT device, the external network device may be one network device in the mobile cellular network.

As shown in FIG. 4, a third-party data transmission device is disposed between the external network device and the IoT device, and is configured to perform security processing on a data packet transmitted between the external network device and the IoT device, to bear some computational overheads of the IoT device. Specifically, the data transmission device may encapsulate the data packet or verify the AH packet header by using a first SA, and the data transmission device may further encrypt the data packet by using a second SA. In this way, when data is transmitted between the external network device and the IoT device, the data transmission device may undertake security processing related to an AH protocol (the AH packet header verification or the encapsulation processing) and/or security processing related to an ESP protocol (the encryption or parsing processing by using the second SA). In other words, the data transmission device bears some computational overheads of the IoT device. This resolves, to some extent, a problem that some power consumption-sensitive IoT devices cannot bear a compute capability required by an IPsec protocol.

In addition, in the data transmission system shown in FIG. 4, the data transmission device is further configured to bear storage overheads of the IoT device. Specifically, the data transmission device is configured to store an SA between the IoT device and another transceiver node. When the IoT device uses the SA, the IoT device may request to obtain the SA from the data transmission device, without occupying storage space of the IoT device. This effectively solves a problem that some power consumption-sensitive IoT devices cannot bear a storage capability required by the IPsec protocol.

In addition, in the data transmission system shown in FIG. 4, the data transmission device stores the first SA and the second SA in a local storage location, and the data transmission device bears some computational overheads and storage overheads of the IoT device. When the solutions in this application are specifically implemented, the storage overheads and the computational overheads may be further separately set.

Figure 5:
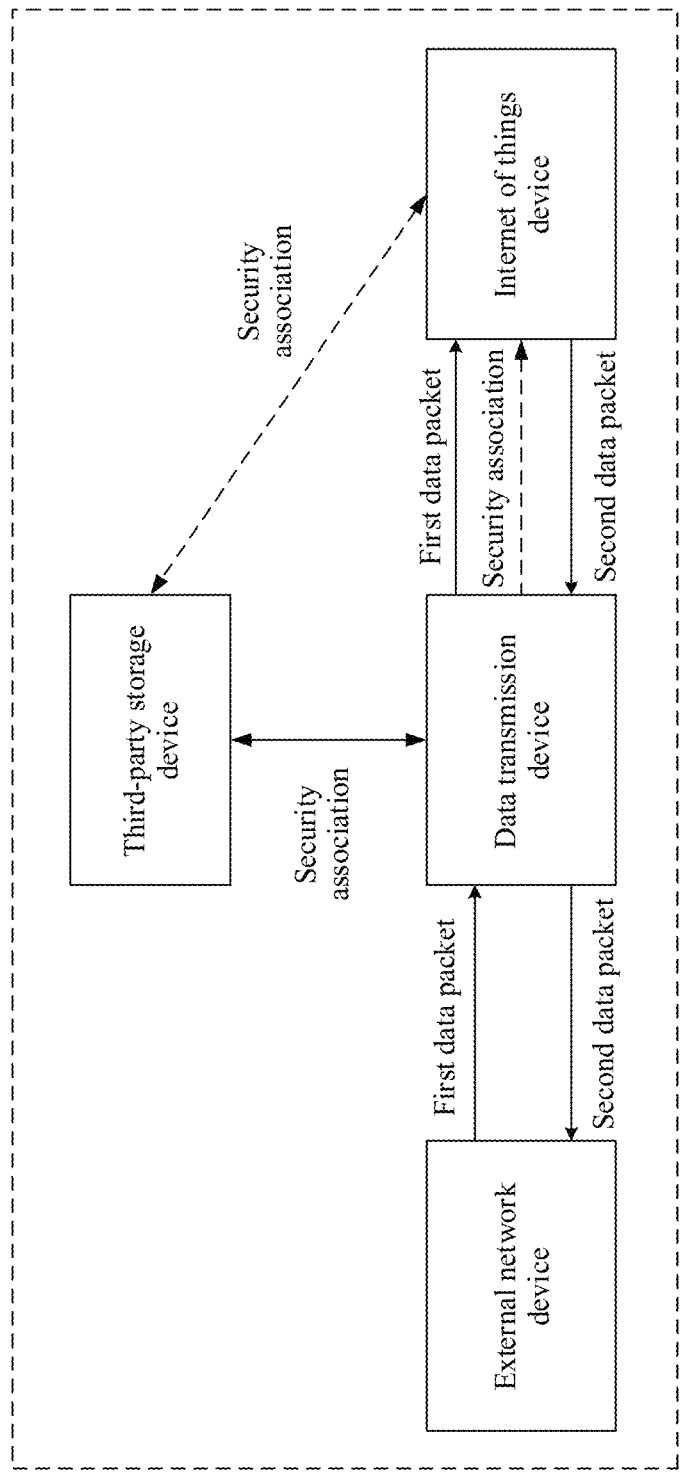
FIG. 5 is a schematic structural diagram of another data transmission system according to this application.

Refer to a schematic architectural diagram of another data transmission system shown in FIG. 5. In the data transmission system, in addition to a data transmission device, a third-party storage device is further disposed. As shown in FIG. 5, the data transmission device may interact with the third-party storage device, to perform security processing by using an SA stored in the third-party storage device. In the scenario architecture shown in FIG. 5, whether the third-party storage device can directly interact with an IoT device is not specifically limited in this embodiment of this application. In a possible design, the IoT device may directly interact with the third-party storage device to obtain the SA. Alternatively, in another possible design, the IoT device cannot directly interact with the third-party storage device. In this case, the IoT device may obtain the SA by using the data transmission device.

In addition, in the design shown in FIG. 4 or FIG. 5, a correspondence between the data transmission system (a compute node), the third-party storage device (a storage node), and the IoT device is not specifically limited in this embodiment of this application.

In a possible design, one compute node (and/or one storage node) may correspond to one independent IoT device. In other words, any IoT device has the independent compute node (and/or one storage node). The IoT device, and the compute node (or the IoT device, the compute node, and the storage node) are in a one-to-one correspondence. In this case, the compute node processes only data interaction between the IoT device and an external network device. The storage node may store only a small quantity of SAs related to the IoT device, to obtain a lightweight design solution. Specifically, considering that there may be a unique pair of SAs between the IoT device and any external network device, a first SA, a second SA, and an identifier of the external network device may be correspondingly stored in the storage node.

Alternatively, in another possible design, one compute node (and/or one storage node) may correspond to a plurality of IoT devices. In other words, the compute node (and/or the storage node) is used to process security processing of the plurality of IoT devices. The storage node also stores SAs between the plurality of IoT devices and other transceiver nodes. For example, in some possible implementation scenarios, one compute node and one storage node may be established for all IoT devices in an entire IoT network. When all the IoT devices in the IoT network exchange data with an external network device, security processing of the compute node is required, and an SA is requested from the storage node. In the implementation scenario, to ensure end-to-end secure communication, there may be a unique pair of SAs between any pair of IoT devices and the external network device. In this case, a first SA, a second SA, an identifier of the IoT device, and an identifier of the external network device may be correspondingly stored in the storage node.

An identifier of a device is used to represent an identity of the device, and may specifically include but is not limited to an internet protocol (IP) address of the device.

In addition, as described above, there may be the unique pair of SAs between any pair of IoT devices and the external network device. A manner of determining the first SA and the second SA is not specially limited in this embodiment of this application. Specifically, the pair of SAs may be manually configured by a user as required, or may be determined by the IoT device and a network device through negotiation.

Figure 6:
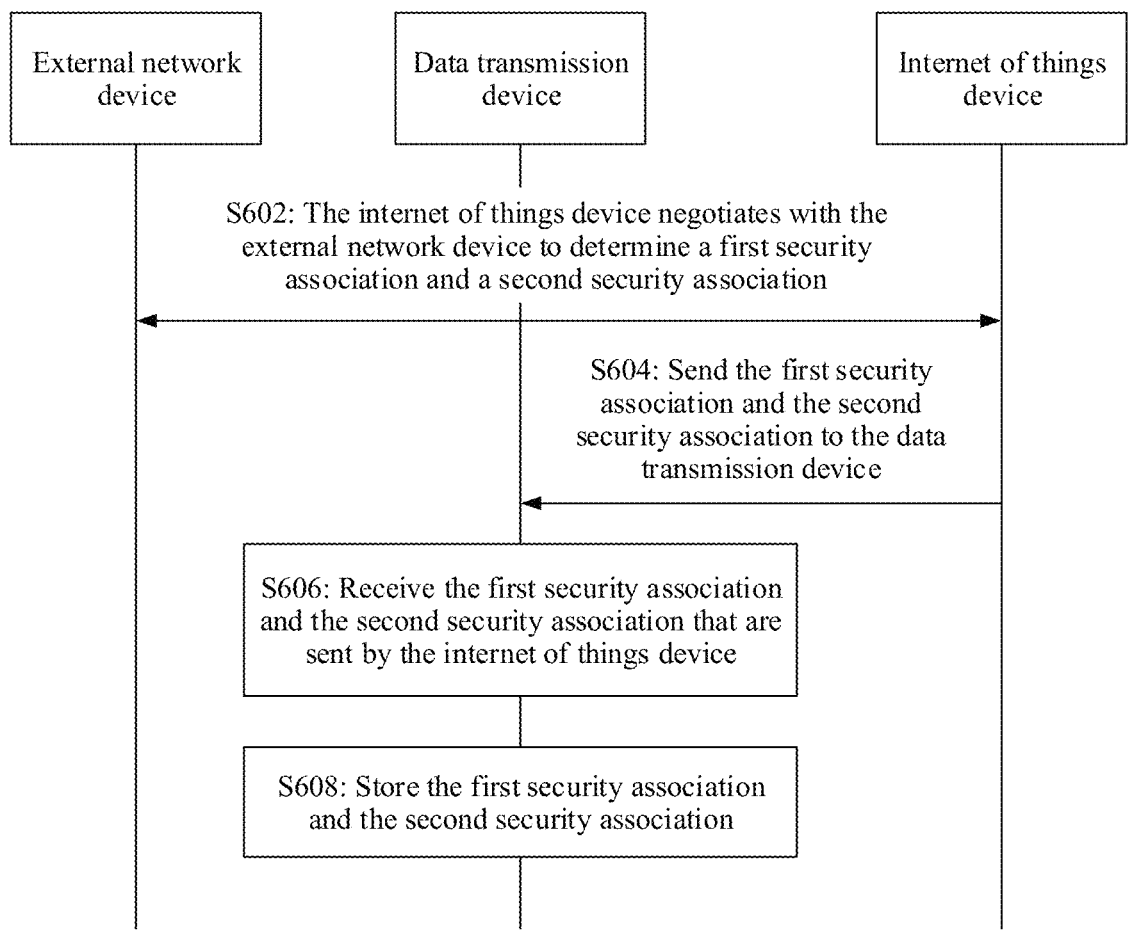
FIG. 6 is a schematic diagram of a storage manner of first SA and second SA according to this application.

In consideration of a design in which a third-party storage node is used to bear storage overheads of the IoT device in this application, when the solution is specifically implemented, a first SA and a second SA may be further stored in a manner shown in FIG. 6.

S602: An IoT device negotiates with an external network device to determine the first SA and the second SA.

As described above, the first SA is obtained by using the AH protocol, the peer address, and the SPI. The second SA is obtained by using the encapsulating security payload ESP protocol, the peer address, and the SPI. Details are not described again.

S604: The IoT device sends the first SA and the second SA to a data transmission device.

S606: The data transmission device receives the first SA and the second SA that are sent by the IoT device.

S608: The data transmission device stores the first SA and the second SA.

Specifically, the first SA and the second SA may be stored in a local storage location or a third-party storage location of the data transmission device.

In addition, it should be noted that, an implementation shown in FIG. 6 is used to reduce storage overheads of the IoT device. Therefore, after sending the first SA and the second SA to the data transmission device, the IoT may delete a locally stored first SA and a locally stored second SA. The deletion may be deleting all SAs, or may be deleting some SAs. In other words, in an actual application scenario, the IoT device may further cache some SAs in local limited storage space, to directly use the cached some SAs subsequently. Specifically, in a process in which the IoT device transmit data with the external network device, the IoT device is mainly configured to parse or encapsulate a data packet by using the second SA. Therefore, in a possible design, the IoT device may locally cache some second SAs, and delete all first SAs.

Further, to improve security of end-to-end data transmission, in an SA negotiation process shown in FIG. 6, before sending the second SA to the data transmission device, the IoT device may further encrypt the second SA by using a local key. In this way, the IoT sends the encrypted second SA to the data transmission device. In other words, the data transmission device stores the encrypted second SA. The IoT device encrypts the second SA by using the local key, so that all second SAs that can be obtained by the data transmission device are encrypted. In other words, the data transmission device cannot parse the data packet by using the encrypted second SA. This further ensures security of the data packet transmitted between the external network device and the IoT device.

As shown in FIG. 4 and FIG. 5, the data transmission device is configured to forward data between the IoT device and the external network device, and perform security processing on the forwarded data, to bear some computational overheads of the IoT device. The data transmission device may be any device other than the IoT device and the external network device.

Specifically, an existing device between the IoT device and the external network device may be used to implement a function of the data transmission device. In a possible design, the data transmission device may be a gateway device between the external network and the IoT network. In this implementation, a small change is made to the existing data transmission system. The solution may be implemented only by performing software maintenance and upgrade on the gateway device and the IoT device, basically without additional consumption on hardware. Therefore, implementation costs are comparatively low, flexibility is comparatively high. Therefore, there is a promising extended application prospect.

Alternatively, a node may be created between the IoT device and the external network device as a data transmission device. In a possible design, the data transmission device is an agent node in the IoT network, and the agent node is configured to exchange data between the gateway device and the IoT device.

Figure 7:
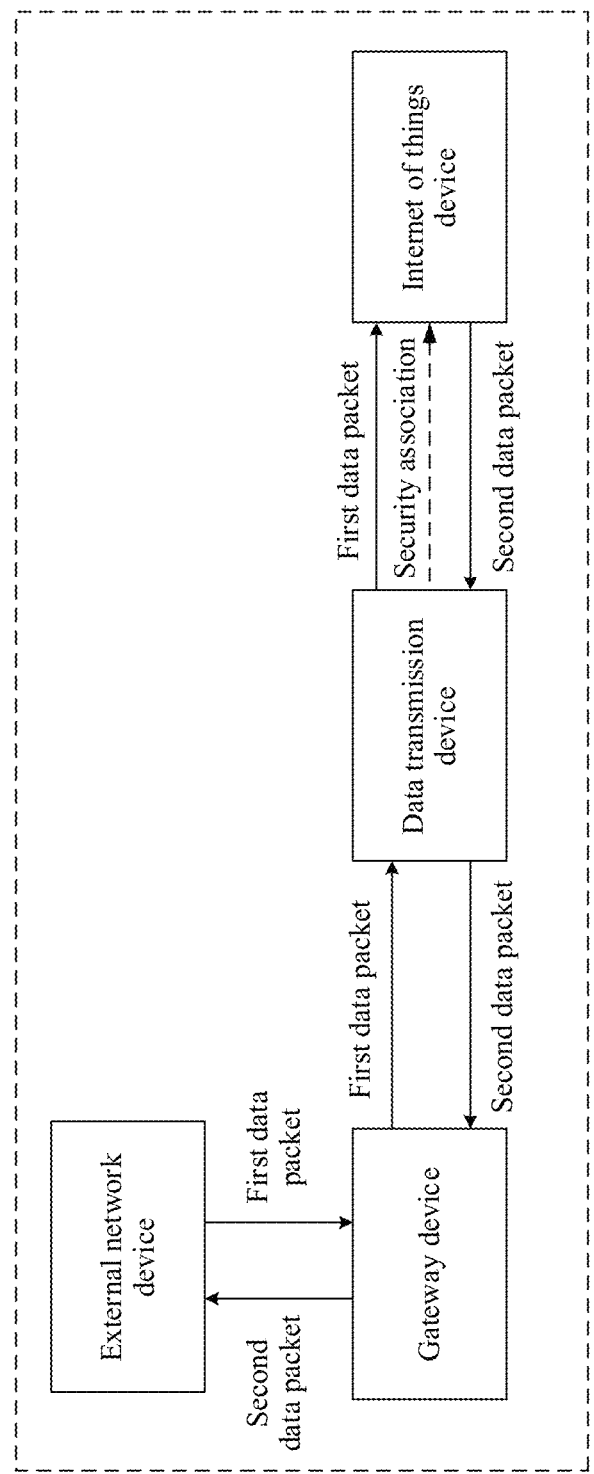
FIG. 7 is a schematic structural diagram of another data transmission system according to this application.

In this case, FIG. 7 is a schematic architectural diagram of another data transmission system. As shown in FIG. 7, the data transmission device is disposed in an IoT network, and is configured to exchange data between an IoT device and a gateway device. The gateway device is configured to forward data between an external network device and the data transmission device. In other words, the IoT device interacts with the external network device by using the data transmission device and the gateway device.

Based on any one of the foregoing architectures of the data transmission systems, the following specifically describes a data transmission solution provided in the embodiments of this application.

For ease of understanding, the following specifically describes two aspects: a scenario in which the IoT device receives data by using the data transmission device (for ease of description, the scenario is referred to as an inbound scenario for short below) and a scenario in which the IoT device sends data to the external network device by using the data transmission device (for ease of description, the scenario is referred to as an outbound scenario for short below).

A first aspect: the inbound scenario

This is the scenario in which the external network device sends a first data packet to the IoT device by using the data transmission device. In the scenario, the data transmission device forwards the data, and performs a part of security processing. Specifically, in this application, end-to-end secure transmission is implemented by using IPsec. In a specific implementation scenario, a data transmission manner between the external network device and the data transmission device is also implemented by using the IPsec. However, based on different IPsec processing manners for the first data packet sent by the external network device, the data transmission device in this application may also use different security processing manners to bear computational overheads of the IoT. Specifically, after receiving the first data packet sent by the external network device, before performing the security processing, the data transmission device further needs to read a packet header of the first data packet, to obtain a next-hop protocol indicated by the packet header of the first data packet. Further, the data transmission device performs the security processing by using an SA corresponding to the next-hop protocol.

In the inbound scenario, the security processing manners used by the data transmission device may include performing packet header verification on the first data packet by using a first SA, and/or sending a second SA to the IoT device, so that the IoT device parses the first data packet by using the second SA.

Specifically, considering that the second SA is mainly used to parse the first data packet in the inbound scenario and the end-to-end secure transmission, an embodiment of this application proposes to transfer, to the data transmission device, computational overheads for verifying an AH packet header of the first data packet.

Figure 8:
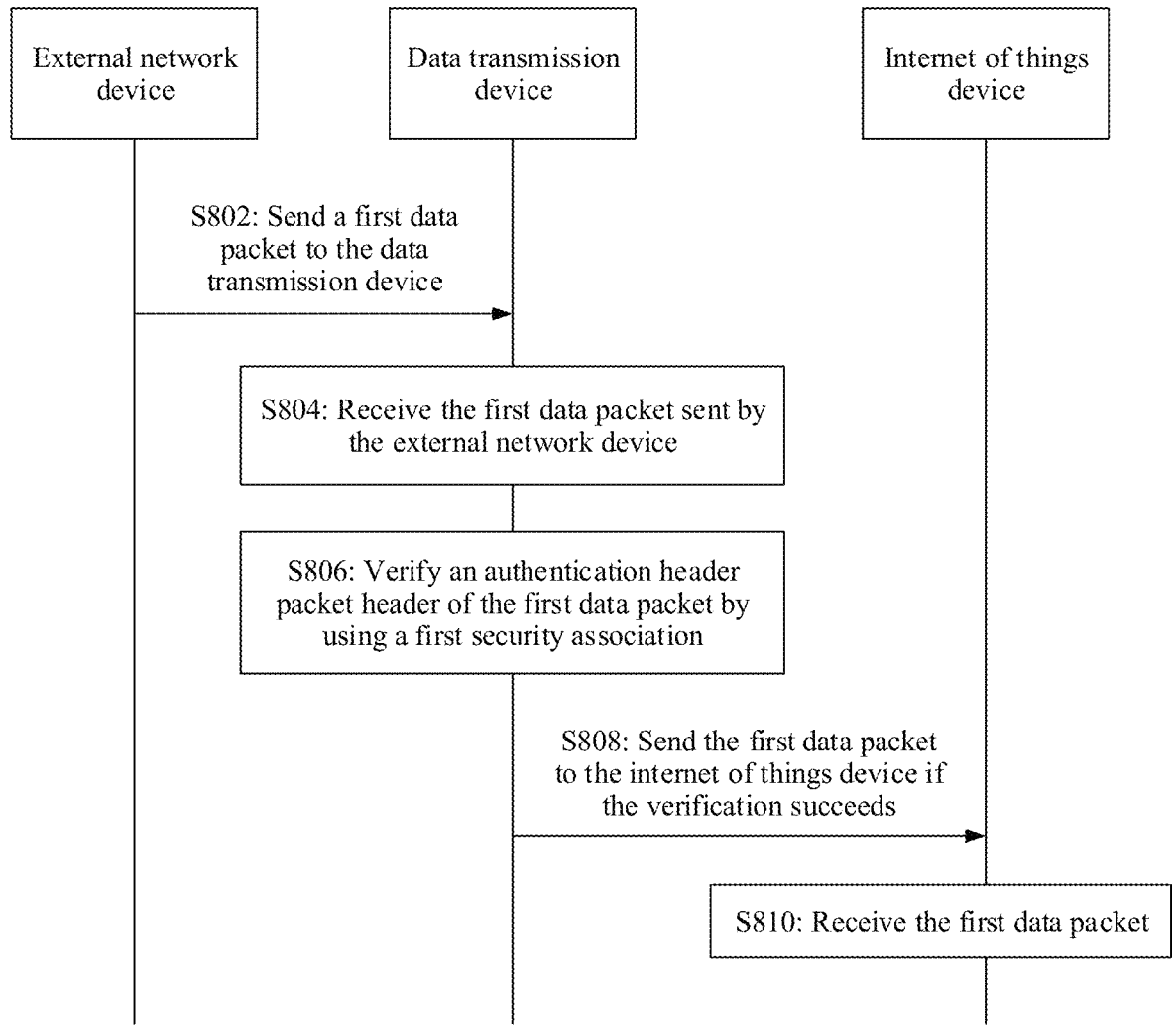
FIG. 8 is a schematic diagram of an interaction procedure of a data transmission method according to an embodiment of this application.

In this case, refer to FIG. 8. FIG. 8 shows a data transmission manner in which security processing is performed by using only a second SA. The method includes the following steps.

S802: An external network device sends a first data packet to a data transmission device.

S804: The data transmission device receives the first data packet sent by the external network device.

In this case, a next-hop protocol indicated by a packet header of the first data packet is an AH protocol. In this case, the first data packet received by the data transmission device is sent after the external network device encapsulates an AH packet header. For an encapsulation process of the AH header, refer to FIG. 2 and descriptions thereof. Details are not described again.

S806: The data transmission device verifies the AH packet header of the first data packet by using a first SA.

A concept of the first SA is described above. An objective of the AH verification is verifying whether the first data packet is complete, and verifying whether a sending source of the first data packet is authentic.

Specifically, a manner for verifying the AH packet header may be as follows: The data transmission device decrypts the AH packet header of the first data packet by using the first SA. If the decryption succeeds, the verification succeeds, and it indicates that the first data packet is complete, without being tampered with by another person, and is authentic at a transmit end of the first data packet.

S808: Send the first data packet to an internet of things IoT device if the verification succeeds.

Otherwise, if the verification fails, the data transmission device may directly discard the first data packet, or may further send verification failure prompt information to the external network device.

S810: The IoT device receives the first data packet.

Figure 9:
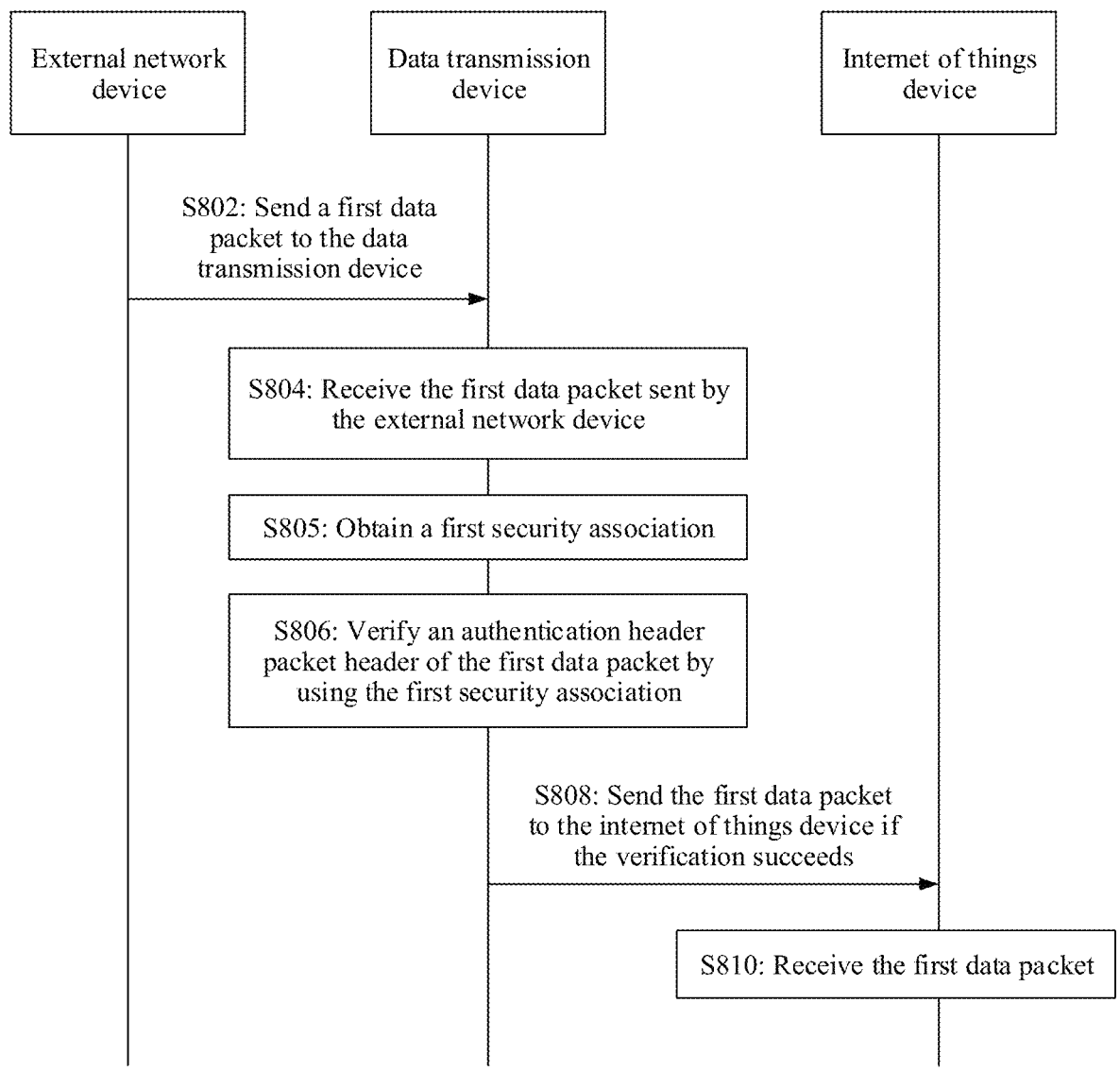
FIG. 9 is a schematic diagram of an interaction procedure of another data transmission method according to an embodiment of this application.

In addition, in the implementation procedure shown in FIG. 8, before the step S806 is performed, refer to FIG. 9. The method may further include the following steps.

S805: The data transmission device obtains a first SA.

Specifically, as described above, the first SA, the second SA, and the device identifiers of the transmit end and the receive end are correspondingly stored. Therefore, a unique SA or a pair of SAs is determined based on an address of the receive end (an address of the IoT device) of the first data packet, protocol information (an AH protocol or an ESP protocol), and a packet security parameter index (SPI). The protocol information is usually carried in an IP packet header of a data packet, and is used to indicate to obtain an SA corresponding to a specific protocol, for example, the first SA, a second SA, or obtain both the first SA and a second SA. The SPI is carried in an AH packet header or an ESP packet header.

In addition, the first SA and the second SA are stored in a corresponding manner. Therefore, when the step is performed, in addition to obtaining one of the SAs, the data transmission device may obtain both the first SA and the second SA, to meet a use requirement in a subsequent security processing process. This helps further simplify steps, and avoids a case that the obtaining step is performed repeatedly when both the AH protocol and the ESP protocol are used for security processing.

However, based on different system architectures, manners in which the data transmission device obtains the first SA are different. In the system architecture shown in FIG. 4, each SA is stored locally in the data transmission device. Therefore, the data transmission device may obtain the first SA from a local storage location. In the system architecture in which computing is separated from storage shown in FIG. 5, the data transmission device may send a first SA obtaining request to the third storage device, to obtain the first SA. The first SA obtaining request carries the foregoing three types of information. Details are not described again.

In addition, in any implementation shown in FIG. 8 or FIG. 9, because the data transmission device undertakes a work of verifying the AH packet header of the first data packet, the IoT device does not repeatedly verify the AH packet header. Therefore, the AH packet header of the first data packet may be removed after the verification succeeds, and the first data packet from which the AH packet header is removed is sent to the IoT device.

In addition, in consideration of any implementation shown in FIG. 8 or FIG. 9, the data transmission device may further perform security processing by using the ESP protocol. Essentially, the second SA is sent to the IoT device, so that the IoT device parses the first data packet by using the second SA.

Figure 10:
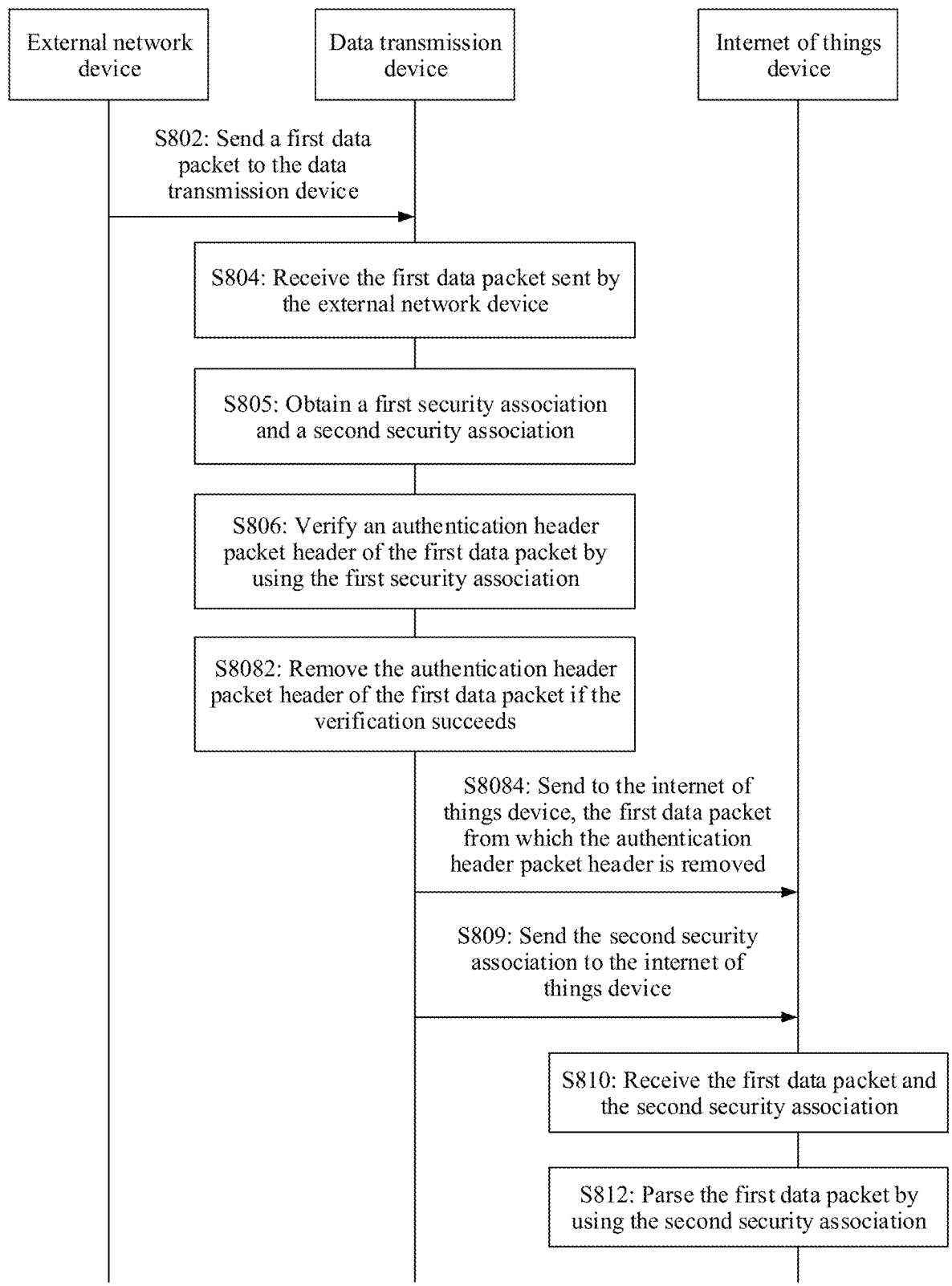
FIG. 10 is a schematic diagram of an interaction procedure of another data transmission method according to an embodiment of this application.

In a possible design, refer to FIG. 10. The method includes the following procedure.

S802: An external network device sends a first data packet to a data transmission device.

S804: The data transmission device receives the first data packet sent by the external network device.

S805: The data transmission device obtains a first SA and a second SA.

In the step, because security processing is separately performed by using an AH protocol and an ESP protocol, the first SA and the second SA may be directly obtained herein.

S806: The data transmission device verifies an AH packet header of the first data packet by using the first SA.

S8082: The data transmission device removes the AH packet header of the first data packet if the verification succeeds.

S8084: The data transmission device sends to an internet of things IoT device, the first data packet being removed the AH packet header.

S809: The data transmission device sends the second SA to the IoT device.

S810: The IoT device receives the first data packet and the second SA.

S812: The IoT device parses the first data packet by using the second SA.

The implementation procedure shown in FIG. 10 is merely a feasible manner, and is not used to limit a manner of sending the second SA and the first data packet in this application.

Specifically, in addition to the manner shown in FIG. 10, the data transmission device independently sends the first data packet and the second SA to the IoT device, the data transmission device may further send the first data packet including the second SA. This can reduce resource occupation to some extent and improve transmission efficiency.

In addition, in the implementation in which the data transmission device independently sends the first data packet and the second SA, the second SA and the first data packet may be simultaneously sent, or the second SA may be sent before or after the first data packet. This is not specifically limited in this application.

In addition, the data transmission device may proactively send the second SA to the IoT device. As shown in FIG. 10, after receiving the first data packet, the data transmission device proactively sends the second SA corresponding to the first data packet to the IoT device. In addition, the data transmission device may further perform, in response to a request from the IoT device, the step of sending the second SA. In this case, the data transmission device sends the first data packet to the IoT device in the manner shown in FIG. 7 or FIG. 8, and sends the second SA to the IoT device after receiving the second SA obtaining request sent by the IoT device. In addition, in the implementation, the step in which the data transmission device obtains the second SA may be performed at any moment after the first data packet is received, as shown in FIG. 10, or may be performed after the second SA obtaining request is received.

In addition, in the inbound scenario in which the security processing is mainly performed by using the AH protocol, in the system shown in FIG. 5, as a receive end of the first data packet, the IoT device obtains the second SA indirectly from the data transmission device in the manner shown in FIG. 10. If the IoT device may directly interact with the third-party storage device, the IoT device may further directly send the second SA obtaining request to the third-party storage device to obtain the second SA. Details are not described again.

In addition, as described above, in a possible design, to ensure the end-to-end secure transmission between the IoT device and the external network device, the second SA is encrypted by using a local key of the IoT device. In this way, the second SA received by the IoT device in the step S810 is encrypted. In this way, when performing the parsing in the step S812, the IoT device further needs to first decrypt the second SA by using the local key, and if the decryption succeeds, parse the first data packet by using the decrypted second SA. In this implementation, it can be ensured that another device other than the IoT device with the local key cannot parse the first data packet, to ensure the end-to-end secure transmission.

Figure 11:
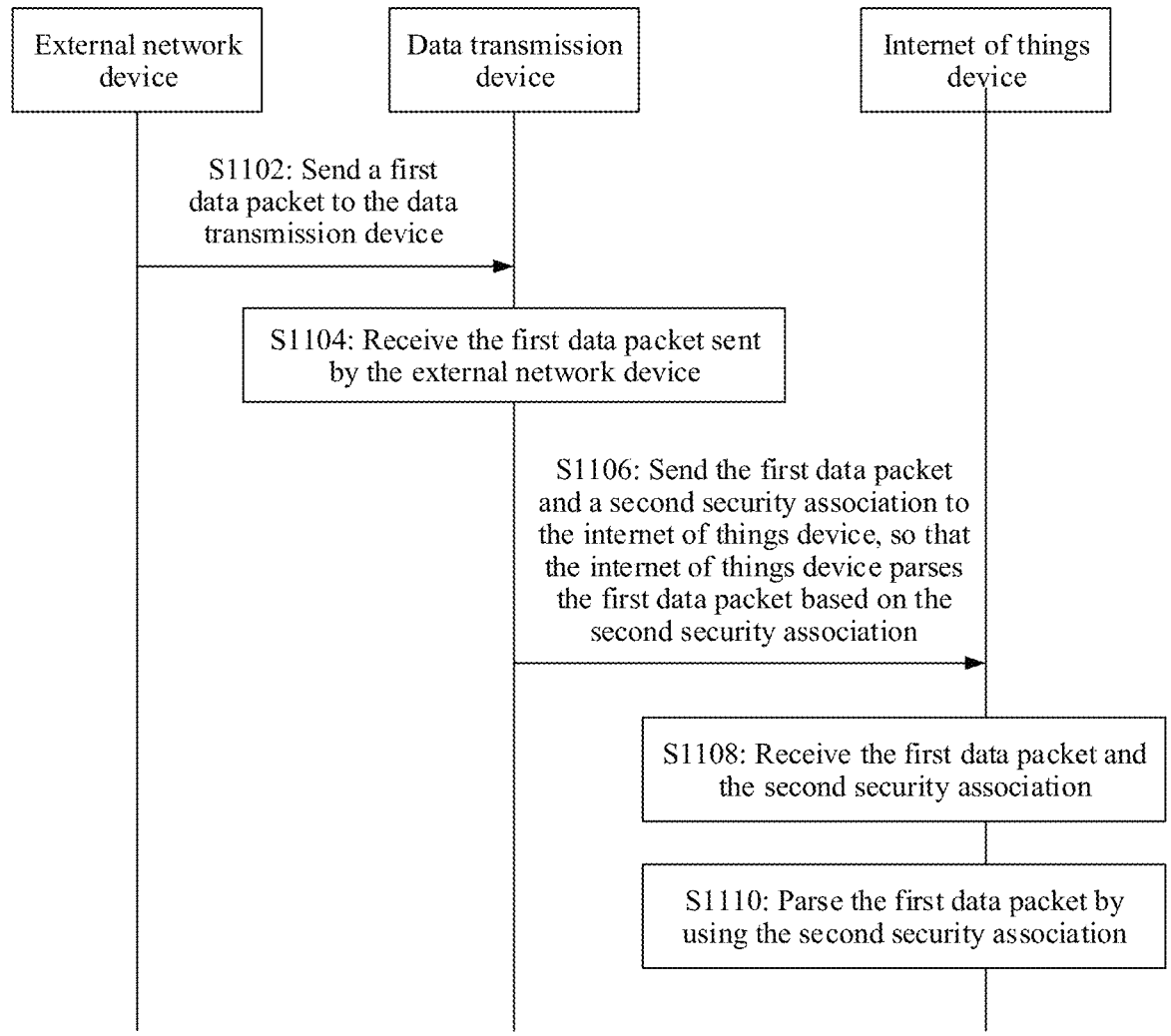
FIG. 11 is a schematic diagram of an interaction procedure of another data transmission method according to an embodiment of this application.

In the inbound scenario, in a possible design other than the foregoing implementation, the data transmission device may further independently send the second SA to the IoT device. In this case, refer to FIG. 11. FIG. 11 shows a data transmission manner in which security processing is performed by using only the second SA. The method includes the following steps.

S1102: An external network device sends a first data packet to a data transmission device.

S1104: The data transmission device receives the first data packet sent by the external network device.

In this case, a next-hop protocol indicated by a packet header of the first data packet is an ESP protocol. In this case, the first data packet received by the data transmission device is sent after the external network device encapsulates the first data packet by using the second SA. For a process of encapsulating the data packet by using the second SA, refer to FIG. 3 and the descriptions thereof. Details are not described again.

S1106: The data transmission device sends the first data packet and the second SA to an internet of things IoT device, so that the IoT device parses the first data packet by using the second SA.

A concept of the second SA is described above, and details are not described again.

A specific sending manner in the step may have a plurality of variations. For details, refer to the foregoing manner of sending the second SA and the first data packet in FIG. 10. Details are not described again.

S1108: The IoT device receives the first data packet and the second SA.

S1110: The IoT device parses the first data packet by using the second SA.

In the method shown in FIG. 11, the data transmission apparatus further needs to obtain the second SA before performing the step S1106. For a manner of obtaining the second SA, refer to the manner of obtaining the first SA shown in FIG. 9. Details are not described again.

However, in the inbound scenario, the AH packet header verification may be further performed on the first data packet. Therefore, in a possible design, the first data packet is sent by the data transmission device after the AH packet header verification is performed by using the first SA succeeds. For an implementation, refer to FIG. 7 or FIG. 8. Details are not described again.

In another possible design, the first data packet is sent after the AH packet header is successfully verified by using the first SA and the AH packet header is removed. For an implementation, refer to FIG. 7 or FIG. 8. Details are not described again.

Correspondingly, for an implementation in which the IoT device parses the first data packet by using the second SA after receiving the first data packet and the second SA, refer to the parsing manner in FIG. 10. Details are not described again. In addition, when the second SA is the second SA encrypted by the IoT device by using the local key, for a parsing manner of the second SA, refer to the parsing manner in FIG. 10. Details are not described again.

The second aspect: the outbound scenario

This is the scenario in which the IoT device sends a second data packet to the external network device by using the data transmission device. In the scenario, the data transmission device forwards the data, and performs a part of security processing. Specifically, in this application, end-to-end secure transmission is implemented by using IPsec. In a specific implementation scenario, a data transmission manner between the external network device and the data transmission device is also implemented by using the IPsec. A parsing manner after the external network device receives the second data packet is not specially limited in this embodiment of this application.

In the outbound scenario, the security processing manners used by the data transmission device may include encapsulating an AH packet header of the second data packet by using a first SA, and/or sending a second SA to an IoT device, so that the IoT device encapsulates the second data packet by using the second SA.

As described above, considering that the second SA is mainly used to encapsulate the second data packet in the outbound scenario and the end-to-end secure transmission, an embodiment of this application proposes to transfer, to the data transmission device, computational overheads for encapsulating the AH packet header of the second data packet.

Figure 12:
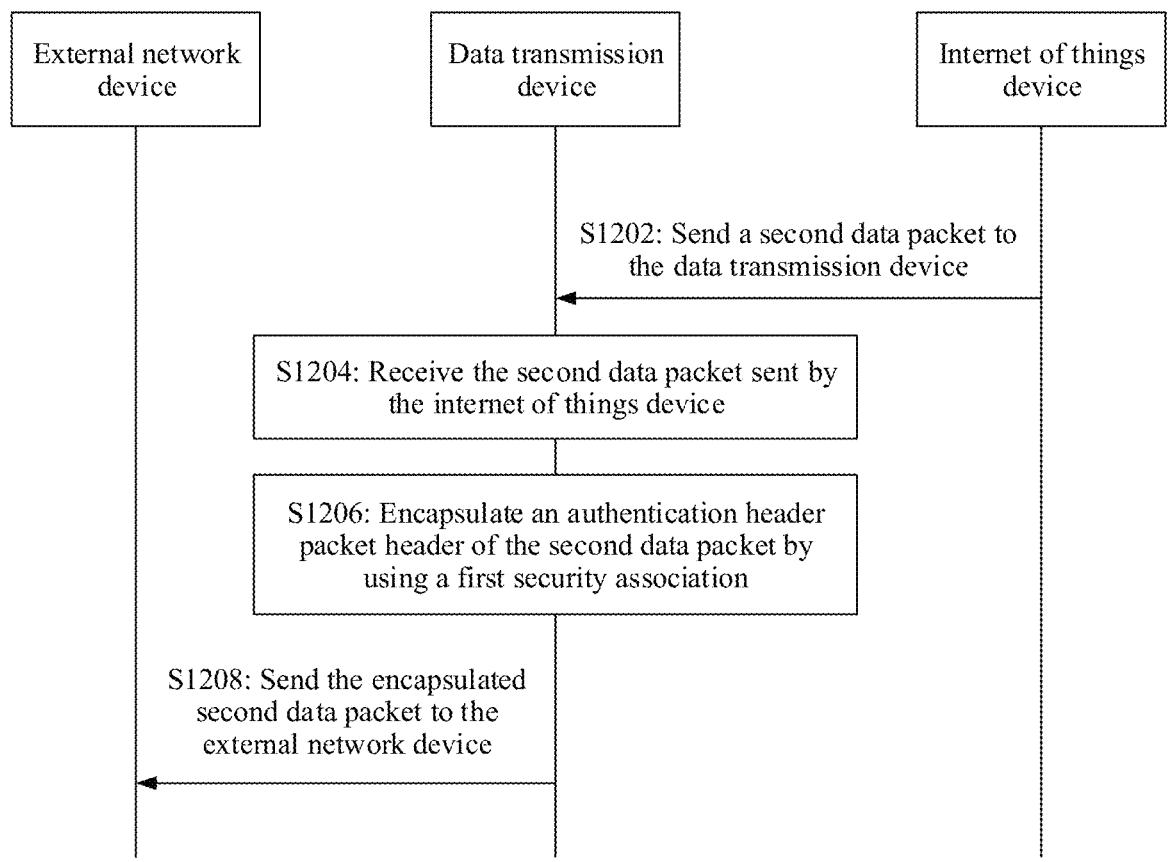
FIG. 12 is a schematic diagram of an interaction procedure of another data transmission method according to an embodiment of this application.

In this case, refer to FIG. 12. FIG. 12 shows a data transmission manner in which security processing is performed by using only a first SA. The method includes the following steps.

S1202: An IoT device sends a second data packet to the data transmission device.

S1204: The data transmission device receives the second data packet sent by the IoT device.

S1206: The data transmission device encapsulates an authentication header AH packet header of the second data packet by using the first SA.

As described above, the first SA is obtained by using the AH protocol, the peer address, and the SPI. The data transmission device encapsulates the AH packet header of the second data packet, so that an external network device can verify, based on the AH packet header, whether an identity of the IoT device is authentic.

S1208: The data transmission device sends an encapsulated second data packet to the external network device.

In an implementation process shown in FIG. 12, before performing the step S1206, the data transmission device further needs to obtain a first SA. For a manner of obtaining the first SA, refer to the manner of obtaining the first SA shown in FIG. 9. Details are not described again.

Figure 13:
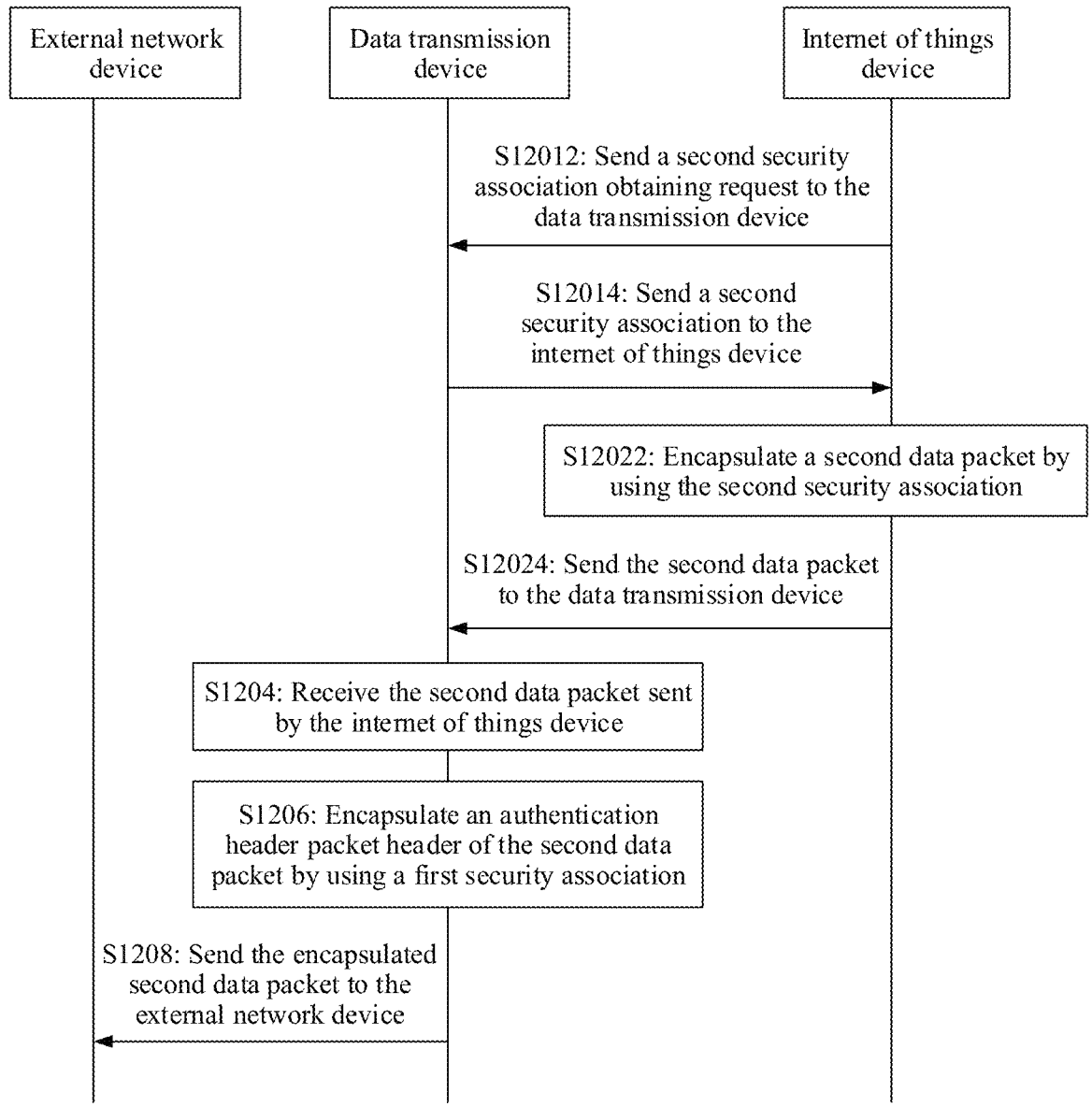
FIG. 13 is a schematic diagram of an interaction procedure of another data transmission method according to an embodiment of this application.

In addition, in a possible design, the second data packet received by the data transmission device is sent by the IoT device after being encapsulated by using a second SA. In the implementation scenario, the IoT device may not buffer the second SA. Therefore, in this implementation, the data transmission device further sends the second SA to the IoT device. An embodiment of this application provides a schematic flowchart of the implementation. Refer to FIG. 13, and the method includes:

S12012: An IoT device sends a second SA obtaining request to a data transmission device.

S12014: The data transmission device sends a second SA to the IoT device.

S12022: The IoT device encapsulates a second data packet by using the second SA.

For an encapsulation process, refer to related descriptions in FIG. 3. Details are not described again.

S12024: The IoT device sends the second data packet to the data transmission device.

S1204: The data transmission device receives the second data packet sent by the IoT device.

S1206: The data transmission device encapsulates an authentication header AH packet header of the second data packet by using a first SA.

S1208: The data transmission device sends an encapsulated second data packet to an external network device.

In addition, if the second data packet is sent by the IoT device after being encapsulated by using the second SA, in the system architecture shown in FIG. 5, before performing the encapsulation step, the IoT device may also send the second SA obtaining request to the third-party storage device to obtain the second SA. Details are not described again.

In addition, similar to the inbound scenario, the second data packet in the outbound scenario may also be a second SA encrypted by using a local key of the IoT device. Therefore, before encapsulating the second data packet by using the second SA, the IoT device further needs to decrypt the received second SA by using the local key, so that the second data packet can be encapsulated by using the second SA obtained after the decryption succeeds. This can ensure that the second data packet can be parsed out only when the external network device corresponding to the second SA receives the second data packet.

On an outbound side, if the IoT device does not encapsulate the second data packet by using the second SA, the IoT device may further send a notification message to the data transmission device, to notify the data transmission device to encapsulate the AH packet header of the second data packet by using the first SA. After receiving the notification message, the data transmission device encapsulates the AH packet header.

Figure 14:
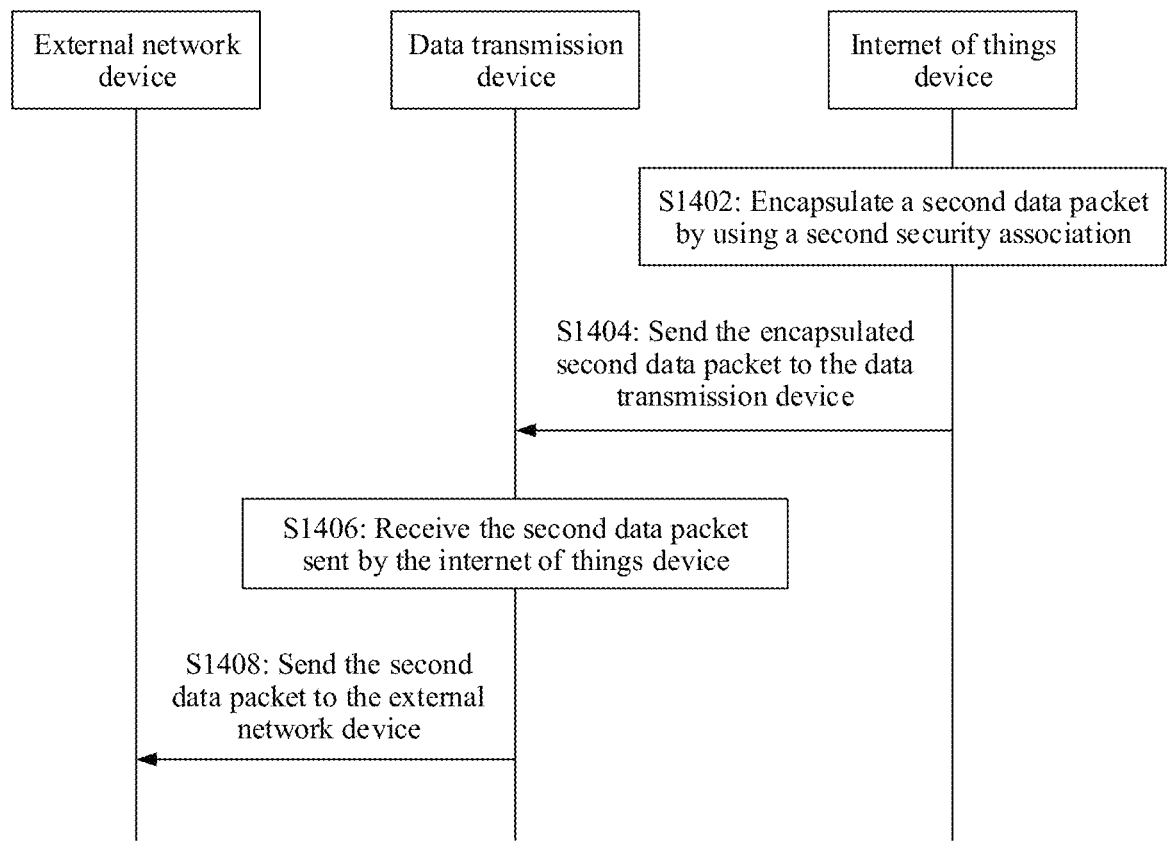
FIG. 14 is a schematic diagram of an interaction procedure of another data transmission method according to an embodiment of this application.

In the outbound scenario, in a possible design other than the foregoing implementation, the data transmission device may further independently send the second SA to the IoT device. In this case, refer to FIG. 14. FIG. 14 shows a data transmission manner in which security processing is performed by using only the second SA. The method includes the following steps.

S1402: An IoT device encapsulates a second data packet by using the second SA.

As described above, the second SA is obtained by using the encapsulating security payload ESP protocol, and is used to ensure integrity and security of the second data packet received by an external network device.

Specifically, for an implementation in which the IoT device encapsulates the second data packet by using the second SA, refer to related descriptions in FIG. 3. Details are not described again.

S1404: The IoT device sends an encapsulated second data packet to a data transmission device.

S1406: The data transmission device receives the second data packet sent by the IoT device.

S1408: The data transmission device sends the second data packet to the external network device.

Specifically, for a manner of obtaining the second SA by the IoT device, refer to the implementation shown in FIG. 13. Details are not described again. In addition, the second data packet in the outbound scenario may also be a second SA encrypted by using a local key of the IoT device. Therefore, before encapsulating the second data packet by using the second SA, the IoT device further needs to decrypt the received second SA by using the local key, so that the second data packet can be encapsulated by using the second SA obtained after the decryption succeeds. This can ensure that the second data packet can be parsed out only when the external network device corresponding to the second SA receives the second data packet.

In addition, in a further extension manner of the implementation shown in FIG. 14, after receiving the second data packet sent by the IoT device, the data transmission device may encapsulate an AH packet header of the second data packet in the manner shown in FIG. 12 or FIG. 13, and send, to the external network device, the second data packet in which the AH packet header is encapsulated.

In addition, in the outbound scenario, as shown in FIG. 13 or FIG. 14, before the IoT device performs the step of encapsulating the second data packet by using the second SA, the IoT device may further determine whether the second data packet needs to be encapsulated by using the second SA.

Specifically, the determining process may be as follows: The IoT device determines, based on a packet header attribute of the second data packet, whether the second data packet needs to be encrypted for transmission. If the second data packet needs to be encrypted for transmission, the IoT device encapsulates the second data packet by using the second SA; or if the second data packet does not need to be encrypted for transmission, the IoT device directly sends the second data packet to the data transmission device. The packet header attribute includes at least one of a source address, a destination address, a data packet name, an upper layer port, and a protocol.

During specific determining, the IoT may calculate a hash value based on content of the packet header of the second data packet, and determine a corresponding hash result based on a preset correspondence. Therefore, whether the second data packet needs to be encrypted for transmission is determined based on the hash result. A correspondence between the hash result and whether the second data packet needs to be encrypted for transmission may be preset as required. For example, if the hash result is 1, it indicates that the second data packet needs to be encrypted for transmission, and at least one type of security processing on the outbound side is performed. If the hash result is 0, it indicates that the second data packet does not need to be encrypted for transmission, and the second data packet may be directly sent.

In addition, the data transmission device may also store data of the packet header attribute, the correspondence, and the SA. In this way, when hash collision occurs, to be specific, hash results of packet headers of different data packets are the same. The data transmission device may send all the results to the IoT device. The IoT device selects, from the results, an SA corresponding to a current data packet to perform an operation.

It should be noted that, if the data transmission method is implemented in the system architecture shown in FIG. 7, the gateway device is further disposed between the data transmission device and the external network device.

Figure 15:
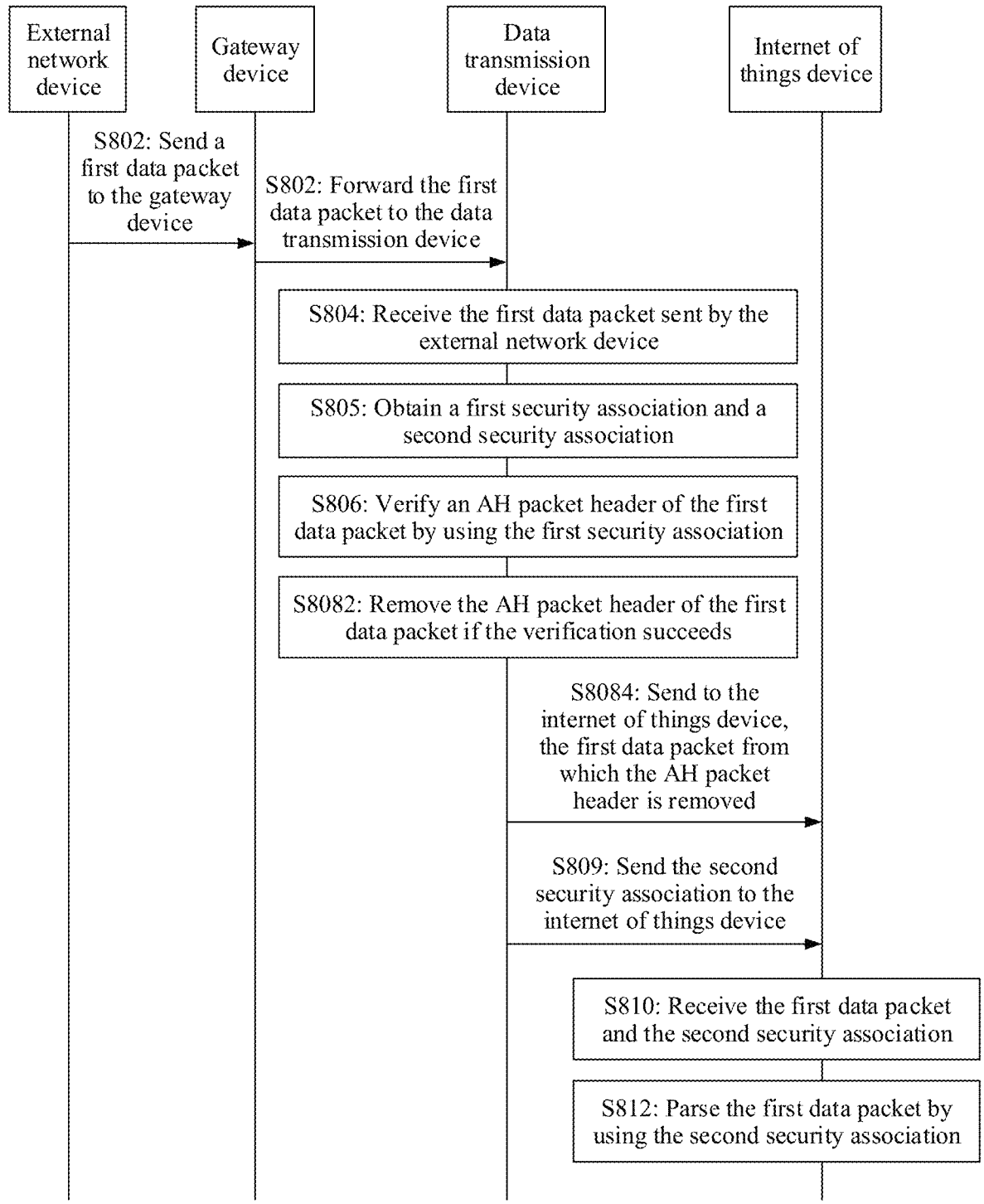
FIG. 15 is a schematic diagram of a procedure of implementing a solution shown in FIG. 10 in a system architecture shown in FIG. 7 according to an embodiment of this application.
Figure 16:
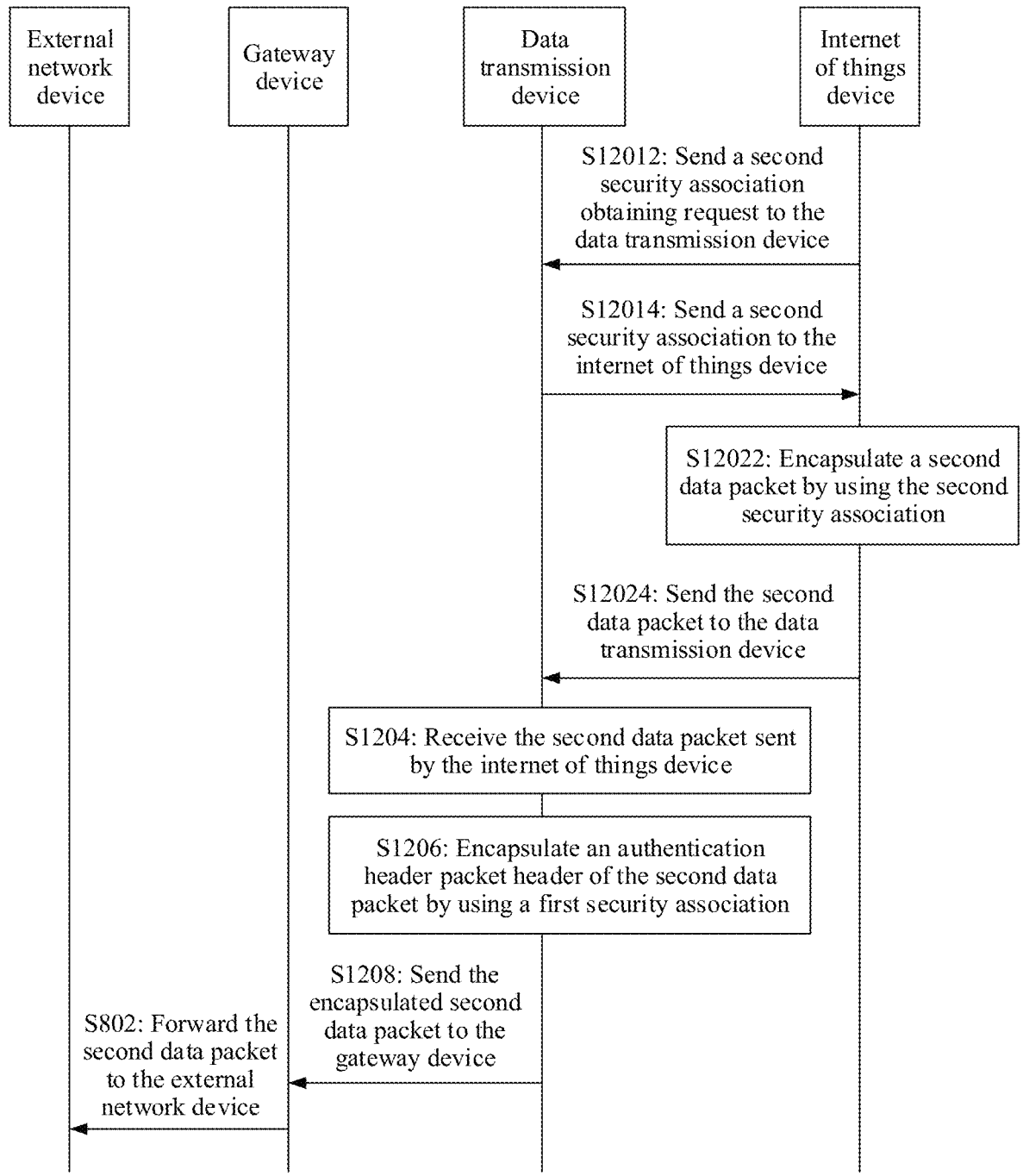
FIG. 16 is a schematic diagram of a procedure of implementing a solution shown in FIG. 13 in a system architecture shown in FIG. 7 according to an embodiment of this application.

In this case, refer to FIG. 15 and FIG. 16. FIG. 15 is a schematic diagram of a procedure of implementing the solution shown in FIG. 10 in the system architecture shown in FIG. 7. FIG. 16 is a schematic diagram of implementing the solution shown in FIG. 13 in the system architecture shown in FIG. 7. As shown in FIG. 15 and FIG. 16, the data transmission device exchanges data with the external network device by using the gateway device.

According to any one of the foregoing implementation solutions, in the embodiments of this application, computational overheads and key storage overheads of security processing of the IoT device are transferred to the data transmission device through interaction between the data transmission device and the IoT device, to implement lightweight and low-power-consumption end-to-end secure transmission between the IoT device and the external network device.

It may be understood that some or all of the steps or operations in the foregoing embodiments are merely examples. Other operations or variations of various operations may be further performed in this embodiment of this application. In addition, the steps may be performed in different sequences presented in the foregoing embodiments, and not all operations in the foregoing embodiments may need to be performed.

Based on the data transmission method, the embodiments of this application further provide a corresponding data transmission device, a corresponding IoT device, and a corresponding data transmission system.

Figure 17:
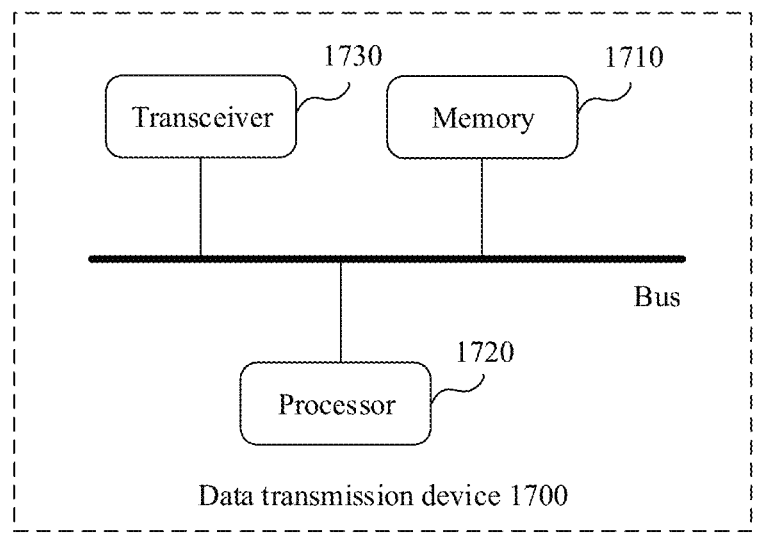
FIG. 17 is a schematic diagram of a structure of a data transmission device according to an embodiment of this application.

FIG. 17 is a schematic diagram of a structure of a data transmission device. The data transmission device 1700 shown in FIG. 17 may be configured to implement a corresponding method on a data transmission device side described in the method embodiments.

The data transmission device 1700 may include one or more processors 1720. The processor 1720 may also be referred to as a processing unit, and may implement a specific control function. The processor 1720 may be a general purpose processor, a dedicated processor, or the like.

In an optional design, the processor 1720 may also store an instruction. The instruction may be run by the processor 1720, so that the data transmission device 1700 performs the method performed on the data transmission device side in the method embodiments.

In still another possible design, the data transmission device 1700 may include a circuit. The circuit may implement a sending function, a receiving function, or a communication function in the method embodiments.

Optionally, the data transmission device 1700 may include one or more memories 1710. The memory 1710 stores an instruction or intermediate data. The instruction may be run on the processor 1720, so that the data transmission device 1700 performs the method described in the method embodiments. Optionally, the memory 1710 may further store other related data. Optionally, the processor 1710 may also store an instruction and/or data. The processor 1720 and the memory 1710 may be disposed separately, or may be integrated together.

Optionally, the data transmission device 1700 may further include a transceiver 1730. The transceiver 1730 may be referred to as a transceiver unit, a transceiver, a transceiver circuit, a transceiver, or the like, and is configured to implement a transceiver function of the data transmission device 1700.

As shown in FIG. 17, the memory 1710, the processor 1720, and the transceiver 1730 communicate with each other through a bus.

The data transmission device 1700 is configured to implement operations on a data transmission device side in the embodiments corresponding to FIG. 6 and FIG. 8 to FIG. 16, for example, the transceiver may be configured to implement data exchange between the data transmission device and the IoT device or the external network device. The transceiver 1730 may further complete another corresponding communication function. The processor 1720 is configured to complete a corresponding determining or control operation, and optionally, may further store a corresponding instruction in the memory 1710. For a specific processing manner of each component, refer to related descriptions in the foregoing embodiment.

Optionally, the data transmission device 1700 may be an independent device or may be a part of a larger device.

Figure 18:
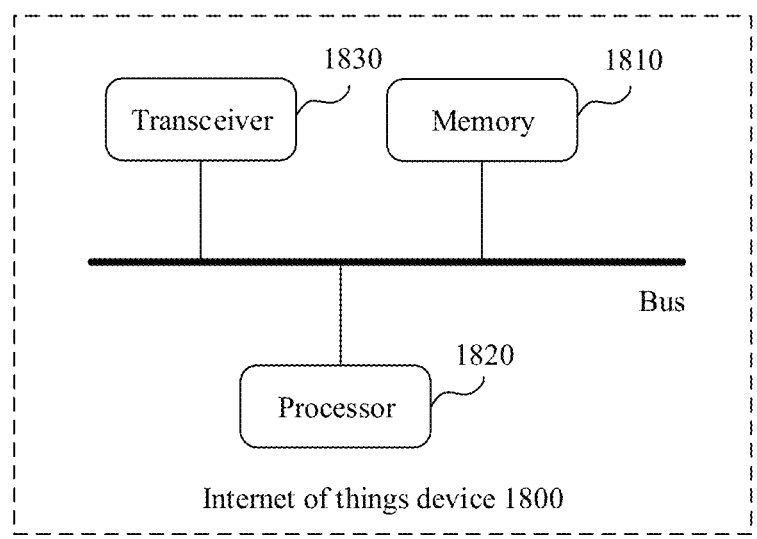
FIG. 18 is a schematic diagram of a structure of an IoT device according to an embodiment of this application.

FIG. 18 is a schematic diagram of a structure of an IoT device. The IoT device 1800 shown in FIG. 18 may be configured to implement a corresponding method on an IoT device side described in the method embodiments.

The IoT device 1800 may include one or more processors 1820. The processor 1820 may also be referred to as a processing unit, and may implement a specific control function. The processor 1820 may be a general purpose processor, a dedicated processor, or the like.

In an optional design, the processor 1820 may also store an instruction. The instruction may be run by the processor 1820, so that the IoT device 1800 performs the method performed by the IoT device side described in the method embodiments.

In still another possible design, the IoT device 1800 may include a circuit. The circuit may implement a sending function, a receiving function, or a communication function in the method embodiments.

Optionally, the IoT device 1800 may include one or more memories 1810. The memory 1810 stores an instruction or intermediate data. The instruction may be run on the processor 1820, so that the IoT device 1800 performs the method described in the method embodiments. Optionally, the memory 1810 may further store other related data. Optionally, the processor 1810 may also store an instruction and/or data. The processor 1820 and the memory 1810 may be disposed separately, or may be integrated together.

Optionally, the IoT device 1800 may further include a transceiver 1830. The transceiver 1830 may be referred to as a transceiver unit, a transceiver, a transceiver circuit, a transceiver, or the like, and is configured to implement a transceiver function of the IoT device 1800.

As shown in FIG. 18, the memory 1810, the processor 1820, and the transceiver 1830 communicate with each other through a bus.

The IoT device 1800 is configured to implement operations on an IoT device side in the embodiments corresponding to FIG. 6 and FIG. 8 to FIG. 16, for example, the transceiver may be configured to implement data exchange with the data transmission device. The transceiver 1830 may further complete another corresponding communication function. The processor 1820 is configured to complete a corresponding determining or control operation, and optionally, may further store a corresponding instruction in the memory 1810. For a specific processing manner of each component, refer to related descriptions in the foregoing embodiment.

Optionally, the IoT device 1800 may be an independent device, or may be a part of a larger device.

Figure 19:
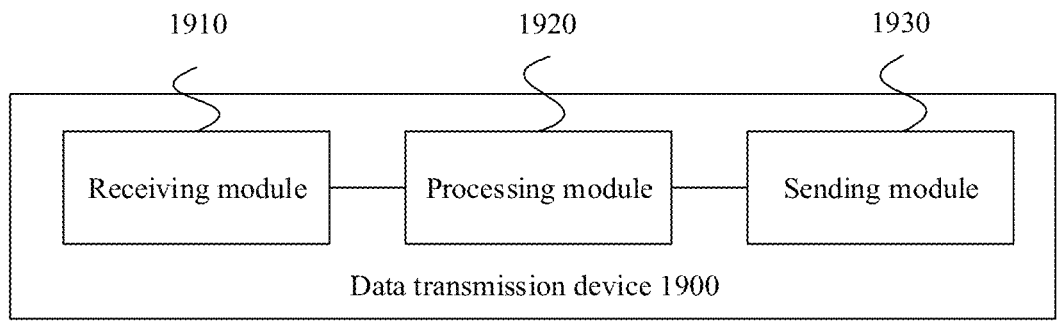
FIG. 19 is a schematic diagram of a structure of another data transmission device according to an embodiment of this application.

FIG. 19 is a schematic diagram of a structure of another data transmission device according to an embodiment of this application. As shown in FIG. 19, the data transmission device 1900 includes a receiving module 1910, a processing module 1920, and a sending module 1930. The receiving module 1910 is configured to receive a first data packet sent by an external network device. The processing module 1920 is configured to verify an authentication header AH packet header of the first data packet by using a first security association SA. The sending module 1930 is configured to send the first data packet to an internet of things IoT device if the verification succeeds.

In FIG. 19, further, the processing module 1920 is further configured to remove the AH packet header of the first data packet. The sending module is specifically configured to send to the IoT device, the first data packet from which the AH packet header is removed.

In a possible manner, the sending module 1930 is further configured to send a second SA to the IoT device, so that the IoT device parses the first data packet by using the second SA.

Further, the data transmission device 1900 further includes a storage module. The receiving module 1910 is further configured to receive a first SA and the second SA that are sent by the IoT device. The storage module is configured to store the first SA and the second SA.

In a possible manner, the first SA and the second SA are determined by the IoT device and the external network device through negotiation.

In another possible manner, the storage module is specifically configured to correspondingly store the first SA, the second SA, an IoT device identifier, and an external network device identifier.

In another possible manner, the first SA and the second SA are stored in a local storage location or a third-party storage location.

In another possible manner, the second SA is a second SA encrypted by using a local key of the IoT device.

In another possible manner, the data transmission device is a gateway device between the external network and the IoT network, or an agent node in an IoT network. The agent node is configured to implement data exchange between the gateway device and the IoT device.

The data transmission device in the embodiment shown in FIG. 19 may be configured to perform the technical solution in the method embodiments. For an implementation principle and a technical effect of the data transmission device, further refer to related descriptions in the method embodiments.

Figure 20:
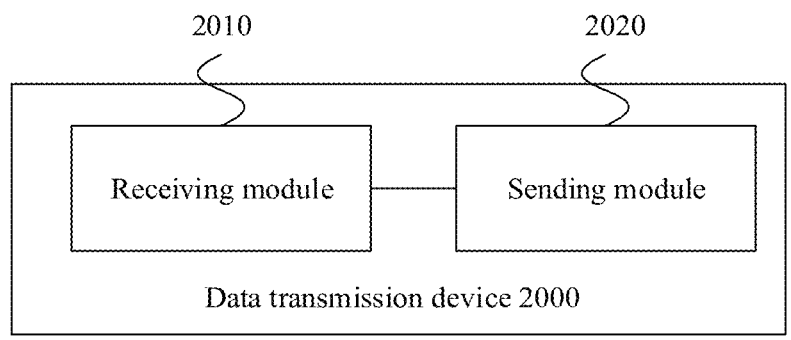
FIG. 20 is a schematic diagram of a structure of another data transmission device according to an embodiment of this application.

FIG. 20 is a schematic diagram of a structure of another data transmission device according to an embodiment of this application. As shown in FIG. 20, the data transmission device 2000 includes a receiving module 2010 and a sending module 2020. The receiving module 2010 is configured to receive a first data packet sent by an external network device. The sending module 2020 is configured to send the first data packet and a second SA to an internet of things IoT device, so that the IoT device parses the first data packet by using the second SA.

In a possible manner, the first data packet is sent after an AH packet header is verified by using a first SA.

Further, the first data packet is sent after the AH packet header is successfully verified by using the first SA and the AH packet header is removed.

Further, the data transmission device 2000 further includes a storage module. The receiving module 2010 is further configured to receive the first SA and the second SA that are sent by the IoT device. The storage module is configured to store the first SA and the second SA.

In a possible manner, the first SA and the second SA are determined by the IoT device and the external network device through negotiation.

In another possible manner, the storage module is specifically configured to correspondingly store the first SA, the second SA, an IoT device identifier, and an external network device identifier.

In another possible manner, the first SA and the second SA are stored in a local storage location or a third-party storage location.

In another possible manner, the second SA is a second SA encrypted by using a local key of the IoT device.

In another possible manner, the data transmission device is a gateway device between the external network and the IoT network, or an agent node in an IoT network. The agent node is configured to implement data exchange between the gateway device and the IoT device.

The data transmission device in the embodiment shown in FIG. 20 may be configured to perform the technical solution in the method embodiments. For an implementation principle and a technical effect of the data transmission device, further refer to related descriptions in the method embodiments.

Figure 21:
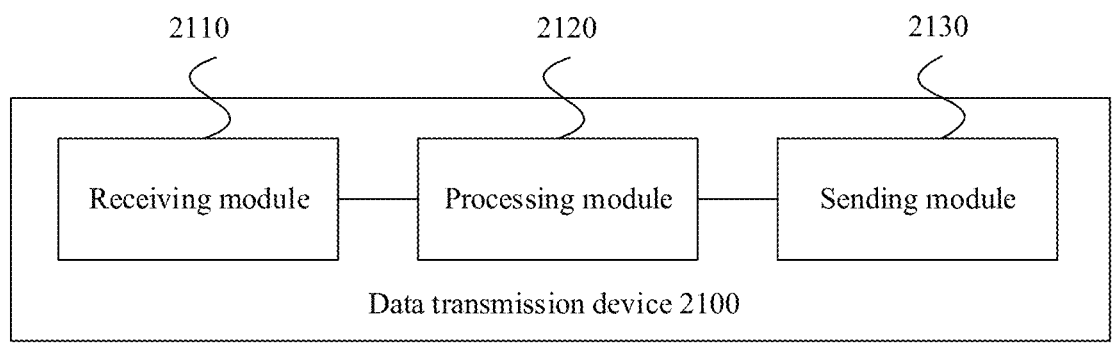
FIG. 21 is a schematic diagram of a structure of another data transmission device according to an embodiment of this application.

FIG. 21 is a schematic diagram of a structure of another data transmission device according to an embodiment of this application. As shown in FIG. 21, the data transmission device 2100 includes a receiving module 2110, a processing module 2120, and a sending module 2130. The receiving module 2110 is configured to receive a first data packet sent by an external network device. The processing module 2120 is configured to verify an authentication header AH packet header of the first data packet by using a first security association SA. The sending module 2130 is configured to send the first data packet to an internet of things IoT device if the verification succeeds.

In a possible manner, the processing module 2120 is further configured to remove the AH packet header of the first data packet. The sending module 2130 is specifically configured to send to the IoT device, the first data packet from which the AH packet header is removed.

In another possible manner, the sending module 2130 is further configured to send a second SA to the IoT device, so that the IoT device parses the first data packet by using the second SA.

Further, the data transmission device 2100 further includes a storage module. The receiving module 2110 is further configured to receive the first SA and the second SA that are sent by the IoT device. The storage module is configured to store the first SA and the second SA.

In a possible manner, the first SA and the second SA are determined by the IoT device and the external network device through negotiation.

In another possible manner, the storage module is specifically configured to correspondingly store the first SA, the second SA, an IoT device identifier, and an external network device identifier.

In another possible manner, the first SA and the second SA are stored in a local storage location or a third-party storage location.

In another possible manner, the second SA is a second SA encrypted by using a local key of the IoT device.

In another possible manner, the data transmission device is a gateway device between the external network and the IoT network, or an agent node in an IoT network. The agent node is configured to implement data exchange between the gateway device and the IoT device.

The data transmission device in the embodiment shown in FIG. 21 may be configured to perform the technical solution in the method embodiments. For an implementation principle and a technical effect of the data transmission device, further refer to related descriptions in the method embodiments.

Figure 22:
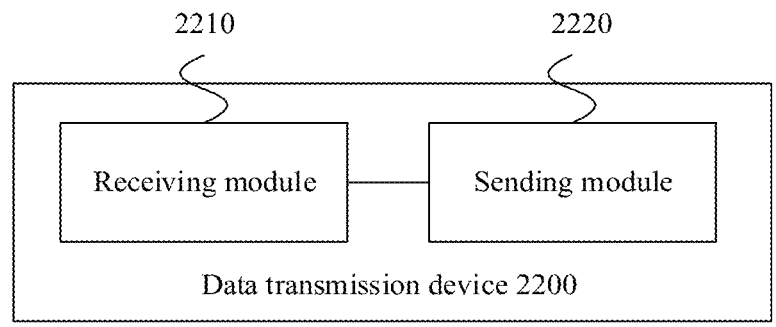
FIG. 22 is a schematic diagram of a structure of another data transmission device according to an embodiment of this application.

FIG. 22 is a schematic diagram of a structure of another data transmission device according to an embodiment of this application. As shown in FIG. 22, the data transmission device 2200 includes a receiving module 2210 and a sending module 2220. The receiving module 2210 is configured to receive a second data packet sent by an internet of things IoT device. The second data packet is sent by the IoT device after being encapsulated by using a second SA. The sending module 2220 is configured to send the second data packet to an external network device.

In a possible manner, the data transmission device 2200 further includes a processing module. The processing module is configured to encapsulate an authentication header AH packet header of the second data packet by using a first SA. The sending module 2220 is specifically configured to send an encapsulated second data packet to the external network device.

In another possible manner, the receiving module 2210 is further configured to receive a second SA obtaining request sent by the IoT device. The sending module 2220 is further configured to send the second SA to the IoT device.

Further, the data transmission device 2200 further includes a storage module. The receiving module 2210 is further configured to receive the first SA and the second SA that are sent by the IoT device. The storage module is configured to store the first SA and the second SA.

In a possible manner, the first SA and the second SA are determined by the IoT device and the external network device through negotiation.

In another possible manner, the storage module is specifically configured to correspondingly store the first SA, the second SA, an IoT device identifier, and an external network device identifier.

In another possible manner, the first SA and the second SA are stored in a local storage location or a third-party storage location.

In another possible manner, the second SA is a second SA encrypted by using a local key of the IoT device.

In another possible manner, the data transmission device is a gateway device between the external network and the IoT network, or an agent node in an IoT network. The agent node is configured to implement data exchange between the gateway device and the IoT device.

The data transmission device in the embodiment shown in FIG. 22 may be configured to perform the technical solution in the method embodiments. For an implementation principle and a technical effect of the data transmission device, further refer to related descriptions in the method embodiments.

Figure 23:
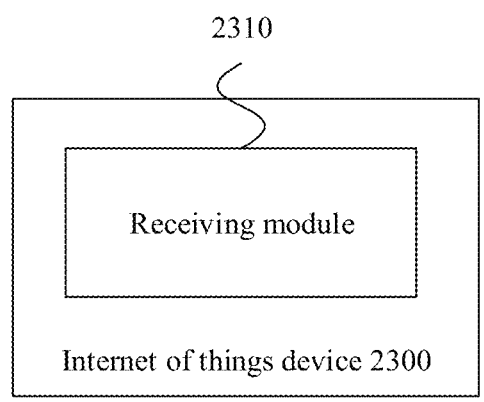
FIG. 23 is a schematic diagram of a structure of another IoT device according to an embodiment of this application.

FIG. 23 is a schematic diagram of a structure of an IoT device according to an embodiment of this application. As shown in FIG. 23, the IoT device 2300 includes a receiving module 2310. The receiving module 2310 is configured to receive a first data packet sent by a data transmission device. The first data packet is sent after the data transmission device successfully verifies an authentication header AH packet header by using a first security association SA.

In a possible manner, the first data packet is sent after the data transmission device successfully verifies the AH packet header by using the first SA and removes the AH packet header.

In another possible manner, the IoT device 2300 further includes a processing module. The receiving module 2310 is further configured to receive a second SA sent by the data transmission device. The SA is obtained by using an encapsulating security payload ESP protocol. The processing module is configured to parse the first data packet by using the second SA.

In another possible manner, the second SA is a second SA encrypted by using a local key of the IoT device.

In another possible manner, the processing module is specifically configured to decrypt the second SA by using the local key, and parse the first data packet by using the decrypted second SA.

Further, the IoT device 2300 further includes a negotiation module and a sending module. The negotiation module is configured to negotiate with an external network device to determine the first SA and the second SA. The sending module is further configured to send the first SA and the second SA to the data transmission device, so that the data transmission device stores the first SA and the second SA.

In another possible manner, the first SA, the second SA, an IoT device identifier, and an external network device identifier are correspondingly stored.

In another possible manner, the first SA and the second SA are stored in a local storage location or a third-party storage location.

In another possible manner, the data transmission device is a gateway device between the external network and the IoT network, or an agent node in an IoT network. The agent node is configured to implement data exchange between the gateway device and the IoT device.

The IoT device in the embodiment shown in FIG. 23 may be configured to perform the technical solution in the method embodiments. For an implementation principle and a technical effect of the IoT device, further refer to related descriptions in the method embodiments.

Figure 24:
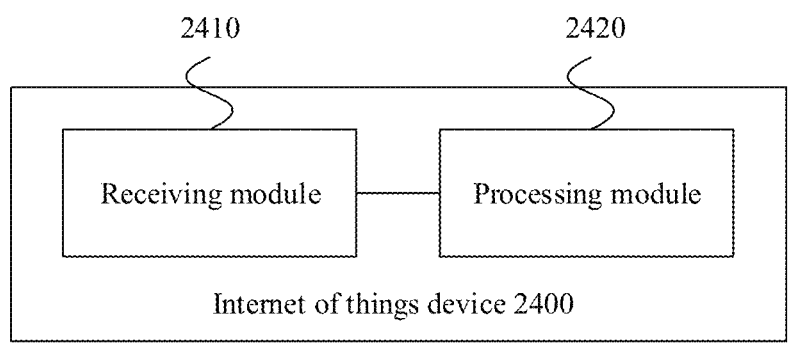
FIG. 24 is a schematic diagram of a structure of another IoT device according to an embodiment of this application.

FIG. 24 is a schematic diagram of a structure of an IoT device according to an embodiment of this application. As shown in FIG. 24, the IoT device 2400 includes a receiving module 2410 and a processing module 2420. The receiving module 2410 is configured to receive a first data packet and a second SA that are sent by a data transmission device. The processing module 2420 is configured to parse the first data packet by using the second SA.

In a possible manner, the first data packet is sent after the data transmission device successfully verifies an AH packet header by using a first SA.

In another possible manner, the first data packet is sent after the data transmission device successfully verifies the AH packet header by using the first SA and removes the AH packet header.

In another possible manner, the second SA is a second SA encrypted by using a local key of the IoT device.

In another possible manner, the processing module 2420 is specifically configured to decrypt the second SA by using the local key, and parse the first data packet by using the decrypted second SA.

Further, the IoT device 2400 further includes a negotiation module and a sending module. The negotiation module is configured to negotiate with an external network device to determine the first SA and the second SA. The sending module is further configured to send the first SA and the second SA to the data transmission device, so that the data transmission device stores the first SA and the second SA.

In another possible manner, the first SA, the second SA, an IoT device identifier, and an external network device identifier are correspondingly stored.

In another possible manner, the first SA and the second SA are stored in a local storage location or a third-party storage location.

In another possible manner, the data transmission device is a gateway device between the external network and the IoT network, or an agent node in an IoT network. The agent node is configured to implement data exchange between the gateway device and the IoT device.

The IoT device in the embodiment shown in FIG. 24 may be configured to perform the technical solution in the method embodiments. For an implementation principle and a technical effect of the IoT device, further refer to related descriptions in the method embodiments.

Figure 25:
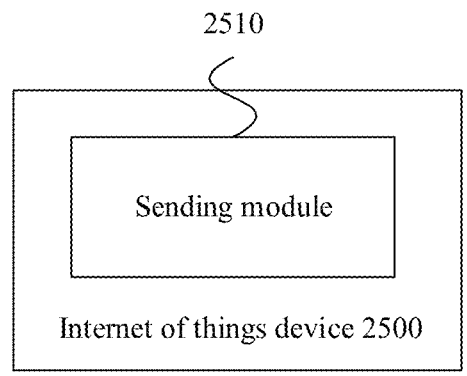
FIG. 25 is a schematic diagram of a structure of another IoT device according to an embodiment of this application.

FIG. 25 is a schematic diagram of a structure of an IoT device according to an embodiment of this application. As shown in FIG. 25, the IoT device 2500 includes a sending module 2510. The sending module 2510 is configured to send a second data packet to a data transmission device, so that the data transmission device encapsulates an authentication header AH packet header of the second data packet by using a first SA, and sends an encapsulated second data packet to an external network device.

In a possible manner, the IoT device further includes a processing module. The processing module is configured to encapsulate the second data packet by using a second SA. The sending module 2510 is specifically configured to send an encapsulated second data packet to the data transmission device.

In another possible manner, the IoT device further includes a receiving module. The sending module 2510 is further configured to send a second SA obtaining request to the data transmission device. The receiving module is configured to receive the second SA sent by the data transmission device.

In another possible manner, the second SA is a second SA encrypted by using a local key of the IoT device.

In another possible manner, the processing module is specifically configured to decrypt the second SA by using the local key, and encapsulate the second data packet by using the decrypted second SA.

Further, the IoT device 2500 further includes a negotiation module. The negotiation module is configured to negotiate with the external network device to determine the first SA and the second SA. The sending module 2510 is further configured to send the first SA and the second SA to the data transmission device, so that the data transmission device stores the first SA and the second SA.

In another possible manner, the first SA, the second SA, an IoT device identifier, and an external network device identifier are correspondingly stored.

In another possible manner, the first SA and the second SA are stored in a local storage location or a third-party storage location.

In another possible manner, the data transmission device is a gateway device between the external network and the IoT network, or an agent node in an IoT network. The agent node is configured to implement data exchange between the gateway device and the IoT device.

The IoT device in the embodiment shown in FIG. 25 may be configured to perform the technical solution in the method embodiments. For an implementation principle and a technical effect of the IoT device, further refer to related descriptions in the method embodiments.

Figure 26:
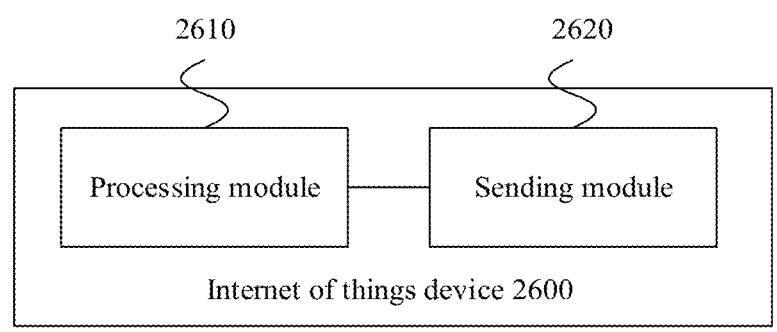
FIG. 26 is a schematic diagram of a structure of another IoT device according to an embodiment of this application.

FIG. 26 is a schematic diagram of a structure of another IoT device according to an embodiment of this application. As shown in FIG. 26, the IoT device 2600 includes a processing module 2610 and a sending module 2620. The processing module 2610 is configured to encapsulate a second data packet by using a second SA. The sending module 2620 is configured to send an encapsulated second data packet to the data transmission device, so that the data transmission device forwards the encapsulated second data packet to an external network device.

In a possible manner, the IoT device further includes a receiving module. The sending module 2620 is further configured to send a second SA obtaining request to the data transmission device. The receiving module is configured to receive the second SA sent by the data transmission device.

In another possible manner, the second SA is a second SA encrypted by using a local key of the IoT device.

In another possible manner, the processing module is specifically configured to decrypt the second SA by using the local key, and encapsulate the second data packet by using the decrypted second SA.

Further, the IoT device 2600 further includes a negotiation module and the sending module. The negotiation module is configured to negotiate with the external network device to determine the first SA and the second SA. The sending module is further configured to send the first SA and the second SA to the data transmission device, so that the data transmission device stores the first SA and the second SA.

In another possible manner, the first SA, the second SA, an IoT device identifier, and an external network device identifier are correspondingly stored.

In another possible manner, the first SA and the second SA are stored in a local storage location or a third-party storage location.

In another possible manner, the data transmission device is a gateway device between the external network and the IoT network, or an agent node in an IoT network. The agent node is configured to implement data exchange between the gateway device and the IoT device.

The IoT device in the embodiment shown in FIG. 26 may be configured to perform the technical solution in the method embodiments. For an implementation principle and a technical effect of the IoT device, further refer to related descriptions in the method embodiments.

It should be understood that division into the modules in the data transmission device shown in FIG. 19 to FIG. 26 is merely logical function division. In an actual implementation, all or some of the modules may be integrated into one physical entity, or physically separated. In addition, all of the modules may be implemented in a form of software invoked by a processing element or in a form of hardware. Alternatively, some of the modules may be implemented in a form of software invoked by a processing element, and some of the modules may be implemented in a form of hardware. For example, the sending module may be an independently disposed processing element, or may be integrated into the data transmission device, for example, the sending module is implemented in a chip of a terminal. In addition, the sending module may be stored in a memory of the data transmission device in a form of a program. A processing element of the data transmission device invokes and performs functions of the foregoing modules. Implementations of other modules are similar. In addition, all or some of the modules may be integrated, or may be implemented independently. The processing element may be an integrated circuit and has a signal processing capability. In an implementation process, steps in the foregoing methods or the foregoing modules can be implemented by using a hardware integrated logical circuit in the processing element, or by using instructions in a form of software.

For example, the foregoing modules may be configured as one or more integrated circuits for implementing the foregoing method, for example, one or more application-specific integrated circuits (ASIC), one or more microprocessors (digital signal processor, DSP), or one or more field programmable gate arrays (FPGA), or the like. For yet another example, when one of the foregoing modules is implemented in a form of a processing element scheduling a program, the processing element may be a general purpose processor, for example a central processing unit (CPU) or another processor that can invoke the program. For still another example, the modules may be integrated together, and implemented in a form of a system-on-a-chip (SOC).

In addition, an embodiment of this application provides a data transmission system. Specifically the following several systems are included.

Figure 27:
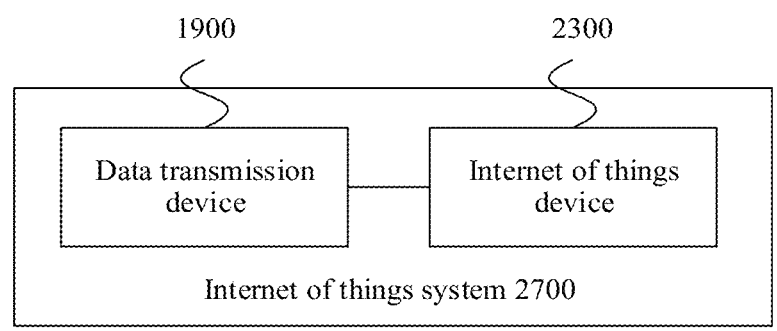
FIG. 27 is a schematic diagram of a structure of a data transmission system according to an embodiment of this application.

FIG. 27 is a schematic diagram of a structure of a data transmission system according to an embodiment of this application. As shown in FIG. 27, the data transmission system 2700 includes a data transmission device 1900 and an IoT device 2300.

As shown in FIG. 27, in the data transmission system 2700, the data transmission device 1900 is configured to receive a first data packet sent by an external network device, verify an authentication header AH packet header of the first data packet by using a first security association SA, and send the first data packet to an internet of things IoT device 2300 if the verification succeeds. The IoT device 2300 is configured to receive the first data packet sent by the data transmission device 1900.

In a possible design, the data transmission device 1900 is further configured to remove the AH packet header of the first data packet and send, to the IoT device 2300, the first data packet from which the AH packet header is removed.

In another possible design, the data transmission device 1900 is further configured to send a second SA to the IoT device 2300. The IoT device 2300 is specifically configured to parse the first data packet by using the second SA.

In another possible design, the second SA is a second SA encrypted by using a local key of the IoT device 2300.

In another possible design, the IoT device 2300 is specifically configured to decrypt the second SA by using the local key, and parse the first data packet by using the decrypted second SA.

In another possible design, the IoT device 2300 is further configured to negotiate with the external network device to determine the first SA and the second SA, and send the first SA and the second SA to the data transmission device 1900. The data transmission device 1900 is further configured to receive the first SA and the second SA that are sent by the IoT device 2300, and store the first SA and the second SA.

Figure 28:
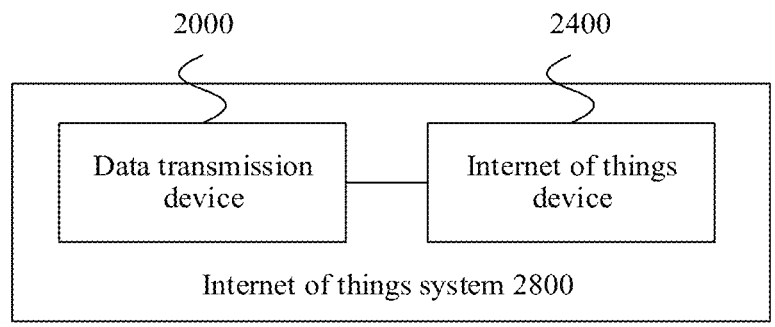
FIG. 28 is a schematic diagram of a structure of another data transmission system according to an embodiment of this application.

FIG. 28 is a schematic diagram of a structure of another data transmission system according to an embodiment of this application. As shown in FIG. 28, the data transmission system 2800 includes a data transmission device 2000 and an IoT device 2400.

As shown in FIG. 28, the data transmission device 2000 is configured to receive a first data packet sent by an external network device, and send the first data packet and a second SA to the internet of things IoT device 2400. The IoT device 2400 is configured to parse the first data packet by using the second SA.

In a possible design, the data transmission device 2000 is further configured to verify an authentication header AH packet header of the first data packet by using a first security association SA, and send the first data packet to the IoT device 2400 after the verification succeeds.

In another possible design, the data transmission device 2000 is further configured to verify an authentication header AH packet header of the first data packet by using a first security association SA, remove the AH packet header of the first data packet after the verification succeeds, and send to the IoT device 2400, the first data packet from which the AH header is removed.

In another possible design, the second SA is a second SA encrypted by using a local key of the IoT device 2400.

In another possible design, the IoT device 2400 is specifically configured to decrypt the second SA by using the local key, and parse the first data packet by using the decrypted second SA.

In another possible design, the IoT device 2400 is further configured to negotiate with the external network device to determine the first SA and the second SA, and send the first SA and the second SA to the data transmission device 2000. The data transmission device 2000 is further configured to receive the first SA and the second SA that are sent by the IoT device 2400, and store the first SA and the second SA.

Figure 29:
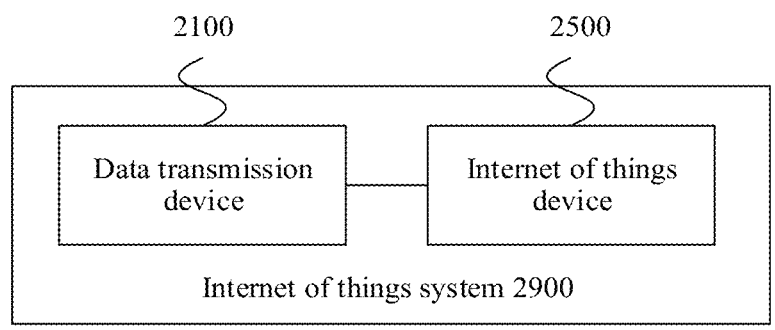
FIG. 29 is a schematic diagram of a structure of another data transmission system according to an embodiment of this application.

FIG. 29 is a schematic diagram of a structure of another data transmission system according to an embodiment of this application. As shown in FIG. 29, the data transmission system 2900 includes a data transmission device 2100 and an IoT device 2500.

As shown in FIG. 29, the IoT device 2500 is configured to send a second data packet to the data transmission device 2100. The data transmission device 2100 is configured to receive the second data packet sent by the internet of things IoT device 2500, encapsulate an authentication header AH packet header of the second data packet by using a first SA, and send an encapsulated second data packet to an external network device.

In a possible design, the IoT device 2500 is further configured to encapsulate the second data packet by using a second SA, and
send an encapsulated second data packet to the data transmission device 2100.

In another possible design, the IoT device 2500 is further configured to send a second SA obtaining request to the data transmission device 2100. The data transmission device 2100 is further configured to receive the second SA obtaining request sent by the IoT device 2500, and send the second SA to the IoT device 2500. The IoT device 2500 is further configured to receive the second SA sent by the data transmission device 2100.

In another possible design, the second SA is a second SA encrypted by using a local key of the IoT device 2500.

In another possible design, the IoT device 2500 is specifically configured to decrypt the second SA by using the local key, and encapsulate the second data packet by using the decrypted second SA.

In another possible design, the IoT device 2500 is further configured to negotiate with the external network device to determine the first SA and the second SA, and send the first SA and the second SA to the data transmission device 2100. The data transmission device 2100 is further configured to receive the first SA and the second SA that are sent by the IoT device 2500, and store the first SA and the second SA.

Figure 30:
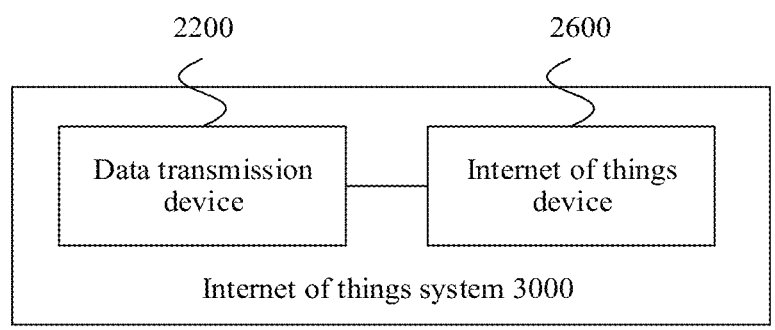
FIG. 30 is a schematic diagram of a structure of another data transmission system according to an embodiment of this application.

FIG. 30 is a schematic diagram of a structure of another data transmission system according to an embodiment of this application. As shown in FIG. 30, the data transmission system 3000 includes a data transmission device 2200 and an IoT device 2600.

As shown in FIG. 30, the IoT device 2600 is configured to encapsulate a second data packet by using a second SA, and send an encapsulated second data packet to the data transmission device 2200. The data transmission device 2200 is configured to receive the second data packet sent by the internet of things IoT device 2600, and send the second data packet to an external network device.

In a possible design, the data transmission device 2200 is further configured to encapsulate an authentication header AH packet header of the second data packet by using a first SA, and send an encapsulated second data packet to the external network device.

In another possible design, the IoT device 2600 is further configured to send a second SA obtaining request to the data transmission device 2200. The data transmission device 2200 is further configured to receive the second SA obtaining request sent by the IoT device 2600, and send the second SA to the IoT device 2600. The IoT device 2600 is further configured to receive the second SA sent by the data transmission device 2200.

In another possible design, the second SA is a second SA encrypted by using a local key of the IoT device 2600.

In another possible design, the IoT device 2600 is specifically configured to decrypt the second SA by using the local key, and encapsulate the second data packet by using the decrypted second SA.

In another possible design, the IoT device 2600 is further configured to negotiate with the external network device to determine the first SA and the second SA, and send the first SA and the second SA to the data transmission device 2200. The data transmission device 2200 is further configured to receive the first SA and the second SA that are sent by the IoT device 2600, and store the first SA and the second SA.

An embodiment of this application further provides a computer-readable storage medium. The computer-readable storage medium stores a computer program. When the computer program runs on a computer, the computer is enabled to perform the data transmission method according to any one of the foregoing embodiments.

In addition, an embodiment of this application further provides a computer program product. The computer program product includes a computer program. When the computer program runs on a computer, the computer is enabled to perform the data transmission method according to any one of the foregoing embodiments.

All or some of the foregoing embodiments may be implemented by using software, hardware, firmware, or any combination thereof. When software is used to implement the embodiments, all or some of the embodiments may be implemented in a form of a computer program product. The computer program product includes one or more computer instructions. When the computer program instructions are loaded and executed on the computer, the procedure or functions according to this application are all or partially generated. The computer may be a general-purpose computer, a dedicated computer, a computer network, or other programmable apparatuses. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line) or wireless (for example, infrared, radio, or microwave) manner. The computer-readable storage medium may be any usable medium accessible by a computer, or a data storage node, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive), or the like.

What is claimed is:

1. A data transmission method comprising:
receiving, by a data transmission device, a data packet sent by an external network device;
verifying, by the data transmission device, an authentication header (AH) packet header of the data packet by using a first security association (SA);
sending, by the data transmission device, the data packet to an internet of things (IoT) device in response to the verification being successful; and
separately sending, by the data transmission device, a second SA to the IoT device after sending the data packet, wherein the second SA is used by the IoT device for decrypting the data packet.

2. The method according to claim 1, wherein sending the data packet to the IoT device comprises:
removing, by the data transmission device, the AH packet header of the data packet; and
sending to the IoT device, by the data transmission device, the data packet from which the AH packet header is removed.

3. The method according to claim 1, wherein the second SA is used by the IoT device to parse the data packet.

4. The method according to claim 3, wherein the second SA is encrypted, by the data transmission device, using a local key of the IoT device.

5. The method according to claim 1, further comprising:
receiving, by the data transmission device, the first SA and the second SA sent by the IoT device, wherein the first SA and the second SA are determined by the IoT device through negotiation with the external network device; and
storing, by the data transmission device, the first SA and the second SA.

6. A data transmission method, applied to a data transmission device, the method comprising:
receiving, by a data transmission device, a data packet sent by an Internet of things (IoT) device;
encapsulating, by the data transmission device, an authentication header (AH) packet header of the data packet by using a first security association (SA);
sending, by the data transmission device, an encapsulated data packet to an external network device; and
separately sending, by the data transmission device, a second SA to the IoT device after sending the data packet, wherein the second SA is used by the IoT device for decrypting the data packet.

7. The method according to claim 6, wherein the data packet is sent by the IoT device after being encapsulated by using the second SA.

8. The method according to claim 6, further comprising:
receiving, by the data transmission device, a second SA obtaining request sent by the IoT device.

9. The method according to claim 7, wherein the second SA is encrypted by using a local key of the IoT device.

10. The method according to claim 6, further comprising:
receiving, by the data transmission device, the first SA and the second SA sent by the IoT device, wherein the first SA and the second SA are determined by the IoT device through negotiation with an external network device; and
storing, by the data transmission device, the first SA and the second SA.

11. A data transmission device comprising:
a receiver configured to cooperate with a processor to receive a data packet sent by an external network device;

the processor configured to verify an authentication header (AH) packet header of the data packet by using a first security association (SA);

a transmitter configured to cooperate with the processor to
send the data packet to an internet of things (IoT) device in response to the verification being successful; and separately send a second SA to the IoT device after sending the data packet, wherein the second SA is used by the IoT device for decrypting the data packet.

12. The data transmission device according to claim 11, wherein the processor is further configured to remove the AH packet header of the data packet; and the transmitter is further configured to cooperate with the processor to send, to the IoT device, the data packet from which the AH packet header is removed.

13. The data transmission device according to claim 11, wherein the second SA is configured for use by the IoT device to parse the data packet.

14. The data transmission device according to claim 13, wherein the second SA is encrypted by using a local key of the IoT device.

15. The data transmission device according to claim 11, wherein the device further comprises:

a memory coupled to the processor;

the receiver is further configured to cooperate with the processor to receive the first SA and the second SA sent by the IoT device; and the memory is configured to store the first SA and the second SA.

16. The data transmission device according to claim 11, wherein the data transmission device is a gateway device between an external network and an IoT network, or the data transmission device is an agent node in the IoT network, and the agent node is configured to exchange data between the gateway device and the IoT device.

17. A data transmission device comprising:

a receiver configured to cooperate with a processor to receive a data packet sent by an internet of things (IoT) device;

the processor configured to encapsulate an authentication header (AH) packet header of the data packet by using a first security association (SA); and a transmitter configured to:
send an encapsulated data packet to an external network device; and separately send, by the data transmission device, a second SA to the IoT device after sending the data packet wherein the second SA is used by the IoT device for decrypting the data packet.

18. The data transmission device according to claim 17, wherein the data packet is sent by the IoT device after being encapsulated by using a second SA.

19. The data transmission device according to claim 17, wherein the receiver is further configured to receive a second SA obtaining request sent by the IoT device.

20. The data transmission device according to claim 18, wherein the second SA is encrypted by using a local key of the IoT device.

* * * * *

UNITED STATES PATENT AND TRADEMARK OFFICE
CERTIFICATE OF CORRECTION

PATENT NO. : 11,652,910 B2
APPLICATION NO. : 17/139581
DATED : May 16, 2023
INVENTOR(S) : Wang et al.

Page 1 of 1

It is certified that error appears in the above-identified patent and that said Letters Patent is hereby corrected as shown below:

In the Claims

Claim 6: Column 30, Line 38: "sent by an Internet of things (IoT) device;" should read -- sent by an internet of things (IoT) device; --.

Claim 17: Column 32, Line 19: "packet wherein the second SA is used by the IoT" should read -- packet, wherein the second SA is used by the IoT --.

Signed and Sealed this
Twenty-second Day of August, 2023

Katherine Kelly Vidal
*Director of the United States Patent and Trademark Office*